(12) United States Patent
Knaappila

(10) Patent No.: US 10,812,993 B2
(45) Date of Patent: Oct. 20, 2020

(54) SYSTEMS AND METHODS FOR CONFIGURING AND PROVIDING MESH COMMUNICATION BETWEEN WIRELESS DEVICES

(71) Applicant: Silicon Laboratories Inc., Austin, TX (US)

(72) Inventor: Jere M. Knaappila, Evitskog (FI)

(73) Assignee: Silicon Laboratories Inc., Austin, TX (US)

( * ) Notice: Subject to any disclaimer, the term of this patent is extended or adjusted under 35 U.S.C. 154(b) by 97 days.

(21) Appl. No.: 15/664,539

(22) Filed: Jul. 31, 2017

(65) Prior Publication Data

US 2019/0037419 A1    Jan. 31, 2019

(51) Int. Cl.
| | |
|---|---|
| *H04W 4/02* | (2018.01) |
| *H04W 24/02* | (2009.01) |
| *H04W 40/12* | (2009.01) |
| *H04L 12/733* | (2013.01) |
| *H04W 52/02* | (2009.01) |
| *H04W 84/18* | (2009.01) |

(52) U.S. Cl.
CPC .......... *H04W 24/02* (2013.01); *H04L 45/122* (2013.01); *H04W 40/12* (2013.01); *H04W 52/0212* (2013.01); *H04W 52/0219* (2013.01); *H04W 52/0229* (2013.01); *H04W 52/0245* (2013.01); *H04W 84/18* (2013.01)

(58) Field of Classification Search
None
See application file for complete search history.

(56) References Cited

U.S. PATENT DOCUMENTS

| | | |
|---|---|---|
| 5,148,180 A | 9/1992 | Beyer et al. |
| 8,723,729 B2 | 5/2014 | Desai et al. |
| 8,965,284 B2 | 2/2015 | Honkanen et al. |
| 9,503,841 B2 | 11/2016 | Knaappila |

(Continued)

FOREIGN PATENT DOCUMENTS

WO    WO2013/126747 A2    8/2013

OTHER PUBLICATIONS

Gunhardson, "Indoor Positioning Using Angle of Departure Information", 2015, 86 pgs.

(Continued)

*Primary Examiner* — Sithu Ko
(74) *Attorney, Agent, or Firm* — Egan Peterman Enders Huston

(57) ABSTRACT

Systems and methods are provided that may be implemented to create a wireless communication path by opening relatively low power wireless non-broadcast node-to-node connections between network nodes between selected wireless nodes of a mesh network, or by implementing inter-node broadcast routing paths within such a network by selectively broadcasting from selected network nodes, based on one or more inter-node signal transmission characteristics measured between different pairs of nodes of the mesh network. When used, the opened connections may employ non-continuous connection listening intervals that are shorter than observer listening times to communicate over designated data channels in a targeted manner between selected routing nodes in a mesh network.

28 Claims, 18 Drawing Sheets

(56) References Cited

U.S. PATENT DOCUMENTS

| | | | |
|---|---|---|---|
| 9,942,849 B1* | 4/2018 | Hariharan | H04W 52/0229 |
| 10,039,057 B1* | 7/2018 | Lam | H04W 4/20 |
| 2014/0094123 A1* | 4/2014 | Polo | H04W 52/0216 |
| | | | 455/41.2 |
| 2014/0148196 A1* | 5/2014 | Bassan-Eskenazi | G01S 11/02 |
| | | | 455/456.1 |
| 2014/0321321 A1 | 10/2014 | Knaappila | |
| 2015/0271628 A1 | 9/2015 | Knaappila | |
| 2015/0271629 A1* | 9/2015 | Knaappila | H04W 4/08 |
| | | | 455/41.2 |
| 2015/0319600 A1 | 11/2015 | Knaappila | |
| 2016/0088424 A1* | 3/2016 | Polo | H04W 4/80 |
| | | | 455/41.1 |
| 2016/0105761 A1* | 4/2016 | Polo | H04W 4/80 |
| | | | 455/41.2 |
| 2016/0165397 A1* | 6/2016 | Yang | G01S 13/765 |
| | | | 455/456.5 |
| 2017/0041868 A1* | 2/2017 | Palin | H04L 5/0048 |
| 2017/0156102 A1* | 6/2017 | Singh | H04W 40/246 |
| 2017/0208564 A1* | 7/2017 | Lee | H04W 4/80 |
| 2017/0353381 A1* | 12/2017 | Qi | H04W 40/24 |
| 2018/0124550 A1* | 5/2018 | Kwon | H04W 4/00 |
| 2019/0037419 A1* | 1/2019 | Knaappila | H04W 52/0229 |
| 2019/0253951 A1* | 8/2019 | Di Marco | H04L 45/16 |

OTHER PUBLICATIONS

Dhope, "Application of Music, Esprit and Root Music in DOA Estimation", University of Zagreb, 2010, 5 pgs.

Xiong et al., "SecureAngle: Improving Wireless Security Using Angle of Arrival Information", ACM, 2010, 6 pgs.

Gotsis et al., "Multiple Signal Direction of Arrival (DOA) Estimation for a Switched Beam System Using Neural Networks", Piers Online, vol. 3, No. 8, 2007, 5 pgs.

Gustafsson et al., "Positioning Using Time Difference of Arrival Measurements", Department of Electrical Engineering, Linkoping University, 4 pgs., (This reference was available prior to the filing of the current patent application).

Knaappila, "Systems and Methods for Initial Authentication of Wireless Communication" U.S. Appl. No. 15/387,004, filed Dec. 21, 2016, SILA:548, 48 pgs.

Qualcomm, "CSRmesh Development Kit", 2016, 2 pgs.

Andersson, "Use Case Possibilities With Bluetooth Low Energy in IoT Applications", White Paper, Dec. 5, 2014, 16 pgs.

Bluetooth Blog, "Get Ready for Bluetooth Mesh!", May 24, 2017, 3 pgs.

ThoughtWorks, "Introduction to Bluetooth Meshes", Nov. 8, 2016, 7 pgs.

Qualcomm, "Bluetooth Mesh", Available prior to the filing dated of the current patent application; 2 pgs.

Wikipedia, "Minimum Spanning Tree", Printed From Internet Jul. 14, 2017, 12 pgs.

Qualcomm, "Proximity Beacon Development Kit", 2016, 2 pgs.

Frenzel, What's the Difference Between IEEE 802.15.4 and ZigBee Wireless?, Electronic Design, Printed from the Internet Jul. 26, 2017, 11 pgs.

Knaappila, "Systems and Methods for Multiantenna Orientation and Direction Detection" U.S. Appl. No. 15/663,326, filed Jul. 28, 2017, SILA:550, 50 pgs.

Knaappila, "Packet Transmission Timing Parameter Discovery for Wireless Communication Sychronization" U.S. Appl. No. 15/197,166, filed Jun. 29, 2016, SILA:526, 35 pgs.

Knaappila, "Systems and Methods for Adaptive Scanning and/or Advertising" U.S. Appl. No. 15/650,405, filed Jul. 14, 2017, SILA:551, 57 pgs.

MBED, "Connection Parameters", Printed From Intetnet Jul. 26, 2017, 6 pgs.

Cisco Connect, Tomorrow Starts here, Delivery Location Based Services With Cisco Enterprise Mobility Services Platform, Feb. 2015, 69 pgs.

Knaappila, "Multiple Link Layers and Advertisement Policies for Wireless Communication", U.S. Appl. No. 15/234,332, filed Aug. 11, 2016, SILA:524; 28 pgs.

* cited by examiner

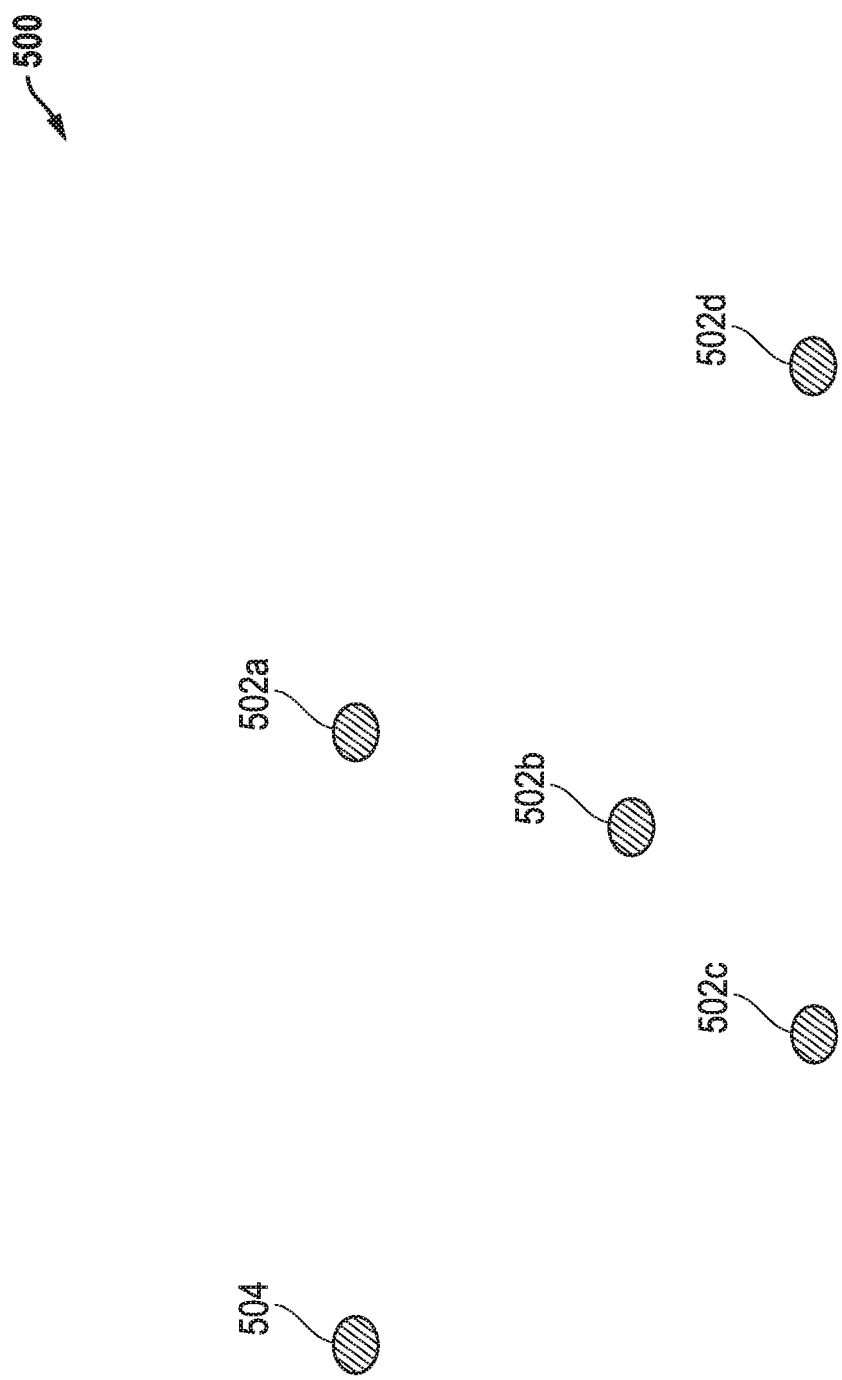

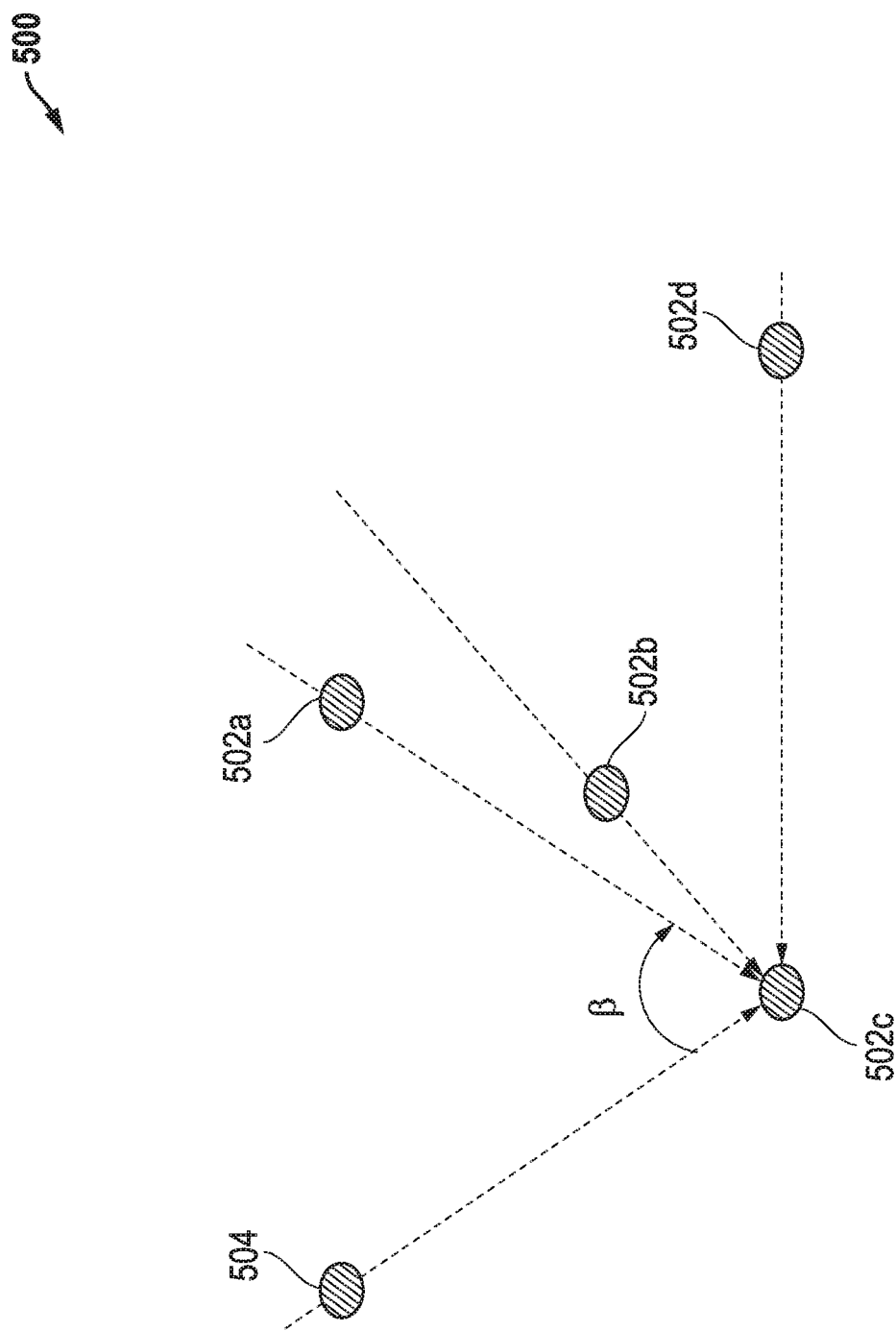

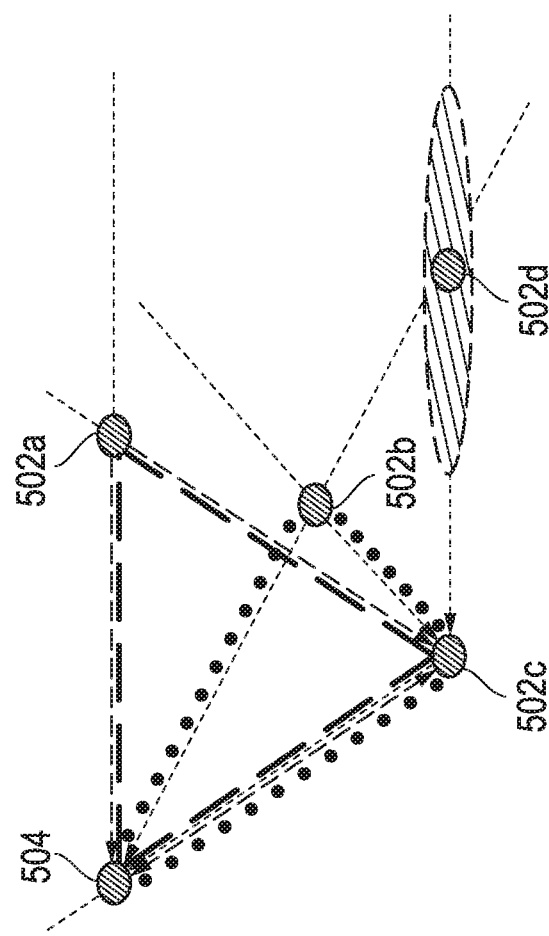

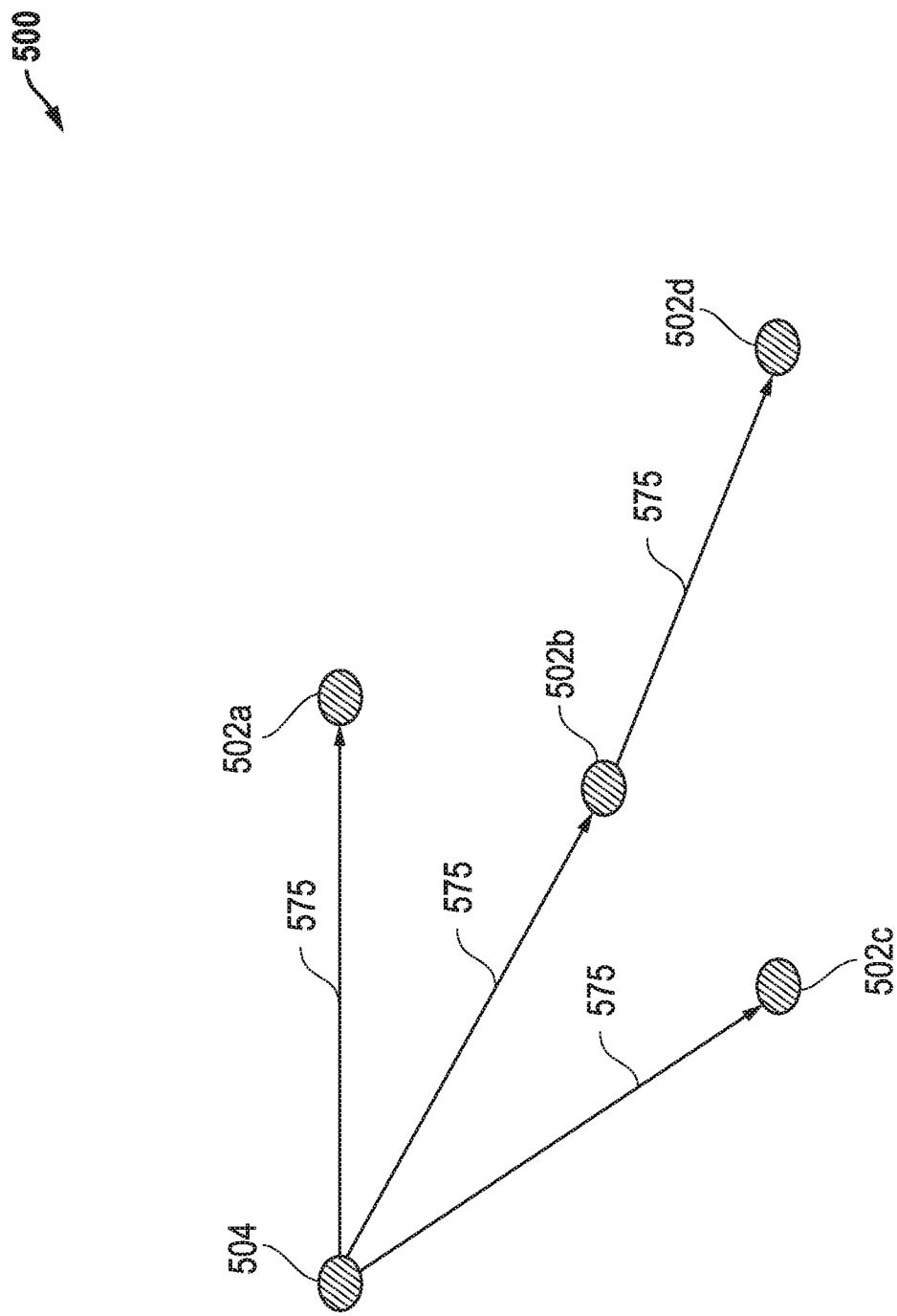

SYSTEMS AND METHODS FOR CONFIGURING AND PROVIDING MESH COMMUNICATION BETWEEN WIRELESS DEVICES

FIELD

The disclosed systems and methods relate to wireless communication and, more particularly, to mesh communication between wireless devices.

BACKGROUND

Bluetooth Low Energy (BLE) relates to Bluetooth wireless radio technology. It has been designed for low-power and low latency applications for wireless devices within short range. Today, BLE applications can be found from healthcare, fitness, security, smart energy, industrial automation and home entertainment. However, BLE is not limited to only those, but increasingly more new application utilizing BLE technology are designed. Specifications for BLE are defined in Bluetooth 4.x (such as Bluetooth 4.0, 4.1, 4.2) and Bluetooth 5 core version specification by the Bluetooth Special Interest Group (SIG).

The difference between BLE and classic Bluetooth is that the BLE devices consume remarkably less power for communication than classic Bluetooth devices. In addition, the BLE is able to start the data transmission much quicker than the classic Bluetooth. This makes it possible to have BLE devices constantly on and to communicate intermittently with other devices.

In BLE technology, one or more so called slave devices can be connected to a master device. To let the master know about the slave devices before connection, the slave devices (or at that point "advertisers") periodically, at pseudo-random intervals, pass advertising packets which the master device (also known as scanner device, i.e. "scanner") is scanning. Depending on the type of advertising packet sent by an advertiser device, the scanner device may respond to the received advertising packet by requesting a connection with the advertiser device, or may respond by requesting further information from the advertiser device. Beacons are a particular type of BLE advertiser device that transmit advertising packets with a unique identifier to nearby portable electronic devices such as smart phones. An application on a portable electronic device may respond to information within an advertising packet received from a beacon by performing an action, such as approximating the location of the portable device. After an advertiser device and scanner device become connected as master and slave, the master device may request bonding with the slave device. This means that the devices exchange long term keys or other encryption info to be stored for future connections. In another case, the master device may request pairing with the slave device, in which case the connection may be encrypted only for the duration of the current connection, during which short term keys are exchanged between the master device and slave device.

BLE devices have been configured to communicate with each other for the Internet of Things (IoT) in a mesh network environment that is broadcast-based. In such a mesh network, a BLE broadcaster device may broadcast advertising packet data to another BLE observer device that is in wireless communication range with the broadcaster device. The BLE observer device receives and re-broadcasts the advertising packet data to other BLE devices that are not in wireless communication range with the original broadcaster device, and thus extends the communication range of the BLE network to BLE observer devices that would otherwise not receive the advertising packet data broadcast from the originating BLE broadcast device. In addition to re-broadcasting an advertising packet, each BLE observer device may also act on the received advertising packet data, such as to perform an action. Broadcasting is a relatively inefficient way of transmitting data, as there are only a limited number of available BLE broadcast channels and the exact transmission time for a broadcast advertising packet from a BLE broadcaster device is not guaranteed, which means a BLE observer device is required to listen a relatively long time before receiving a broadcast advertising packet.

Current BLE mesh network protocol also supports transmitting packets over an established BLE connection, but only to support BLE connections between a single BLE advertiser device and a legacy BLE scanner device, such as smart phone that is in wireless communication range with the BLE advertiser.

SUMMARY

Disclosed herein are systems and methods that may be implemented to create a wireless communication path by opening relatively low power wireless non-broadcast node-to-node connections between network nodes between selected wireless nodes of a mesh network (e.g., such as BLE device nodes of a BLE mesh network), or by implementing inter-node broadcast routing paths within such a network by selectively broadcasting from selected network nodes, based on one or more inter-node signal transmission characteristics measured between different pairs of nodes of the mesh network. Examples of such inter-node signal transmission characteristics include, but are not limited to, received signal strength indicator (RSSI) or received signal decibel-milliwatts (dBm), Angle of Arrival (AoA), Angle of Departure (AoD), etc.

In one embodiment, opened non-broadcast connections may employ non-continuous connection listening intervals that are shorter than observer listening times to communicate over designated data channels in a targeted manner between selected routing nodes in a mesh network. This is in contrast to normal broadcast mesh communications that require routing mesh nodes to continuously listen for communication on designated broadcast or advertising channels while consuming power. Thus, the disclosed systems and methods may be implemented to establish connections over data channels between neighboring mesh nodes in a manner that optimizes mesh communications by conserving power relative to normal broadcast mesh communications, while at the same time limiting unnecessary radio transmissions on crowded broadcast or advertising channels. This may be implemented in one embodiment in a manner that simplifies network configuration, reduces latency and improves network performance.

In one embodiment of the disclosed systems and methods, each given node of a wireless mesh network may measure one or more inter-node signal transmission characteristics of network signals received from one or more other network nodes that are in wireless communication range with the given node, and may transmit these measured inter-node signal transmission characteristics to a designated control node (e.g., such as a smart phone configured as a BLE device). In one exemplary embodiment, the measured inter-node signal transmission characteristics may be transmitted by broadcast signals to one or more designated control nodes through multiple different nodes of an existing broadcast-based network mesh. In another exemplary embodiment, a designated control node may store measured inter-node signal transmission characteristics read out from each of the other given nodes of the mesh network, e.g., by direct wireless communication (broadcast or connection) with each other given node during system installation, or by user-placement of the control node within wireless communication of each other node for long enough to read out or measure the inter-node signal transmission characteristics from each corresponding other node. In any case, a control node may use the one or more measured inter-node signal transmission characteristics to determine optimized or optimum non-broadcast connection paths between the individual nodes of the wireless network.

For example, in one embodiment, a control node may use measured signal strength (e.g., "RSSI") between individual nodes to determine non-broadcast node-to-node connection paths or inter-node broadcast routing paths to employ between nodes. In another embodiment, a control node may calculate spatial location and/or orientation of each of the other given nodes of the mesh network, and may then determine connection paths (e.g., optimized or optimum connection paths) between the individual nodes of the wireless network based on the calculated spatial orientation and/or orientation of each of the other given nodes of the mesh network. However determined, the control node may then transmit (e.g., by a mesh broadcast signal) connection path configuration information that specifies determined inter-node connection paths to the other mesh network nodes in order to cause implementation of the determined optimized or optimum connection paths for mesh data routing within the mesh network. Each of the other network nodes may be configured to respond to the received connection path configuration information by opening a non-broadcast wireless connection path (e.g., such as a BLE connection) to one or more neighboring wireless node/s that are specified by the connection path configuration information, and then transferring mesh data to the neighboring wireless node/s over the opened wireless connection/s.

In one respect, disclosed herein is a method of operating multiple wireless devices as network nodes in a mesh network, including: transmitting wireless signals between at least two different pairs of network nodes in the mesh network; measuring one or more inter-node signal transmission characteristics of the signals transmitted between the at least two different pairs of network nodes in the mesh network; determining mesh communication control information for the mesh network based on the inter-node signal transmission characteristics measured between the different pairs of network nodes of the mesh network; and then wirelessly transferring data between the multiple network nodes according to the determined mesh communication control information.

In another respect, disclosed herein is an apparatus, including at least one processing device coupled to radio circuitry and configured to be coupled to an antenna as a first wireless network node in a wireless mesh network that includes multiple other network nodes. The at least one processing device may be programmed to operate the first wireless network node to: receive wireless signals transmitted from at least one other network node in the mesh network; receive and/or measure inter-node signal transmission characteristics measured between at least two different pairs of network nodes of the mesh network; determine mesh communication control information for the mesh network based on the inter-node signal transmission characteristics measured between the different pairs of network nodes of the mesh network; and then wirelessly communicate the determined mesh communication control information to other nodes of the wireless mesh network determining mesh communication control information.

In another respect, disclosed herein is a system, including: a first apparatus including at least one processing device coupled to radio circuitry and configured to be coupled to an antenna as a first wireless network node in a wireless mesh network that includes multiple other network nodes; a second apparatus including at least one processing device coupled to radio circuitry and configured to be coupled to an antenna as a second wireless network node in the wireless mesh network. The at least one processing device of the second apparatus may be programmed to operate the second wireless network node to: receive and/or measure inter-node signal transmission characteristics measured between at least two different pairs of network nodes of the mesh network, determining mesh communication control information for the mesh network based on the inter-node signal transmission characteristics measured between the different pairs of network nodes of the mesh network, and then wirelessly communicate the determined mesh communication control information to other nodes of the wireless mesh network, the other nodes including the first network node. The at least one processing device of the first network node may be further programmed to receive the determined mesh communication control information and wirelessly transfer data to one or more other network nodes according to the determined mesh communication control information.

BRIEF DESCRIPTION OF THE DRAWINGS

FIG. 5A illustrates a mesh network according to one exemplary embodiment of the disclosed systems and methods.

FIG. 5C illustrates a mesh network according to one exemplary embodiment of the disclosed systems and methods.

FIG. 5F illustrates a mesh network according to one exemplary embodiment of the disclosed systems and methods.

FIG. 5K illustrates a mesh network according to one exemplary embodiment of the disclosed systems and methods.

DESCRIPTION OF ILLUSTRATIVE EMBODIMENTS

Figure 1:
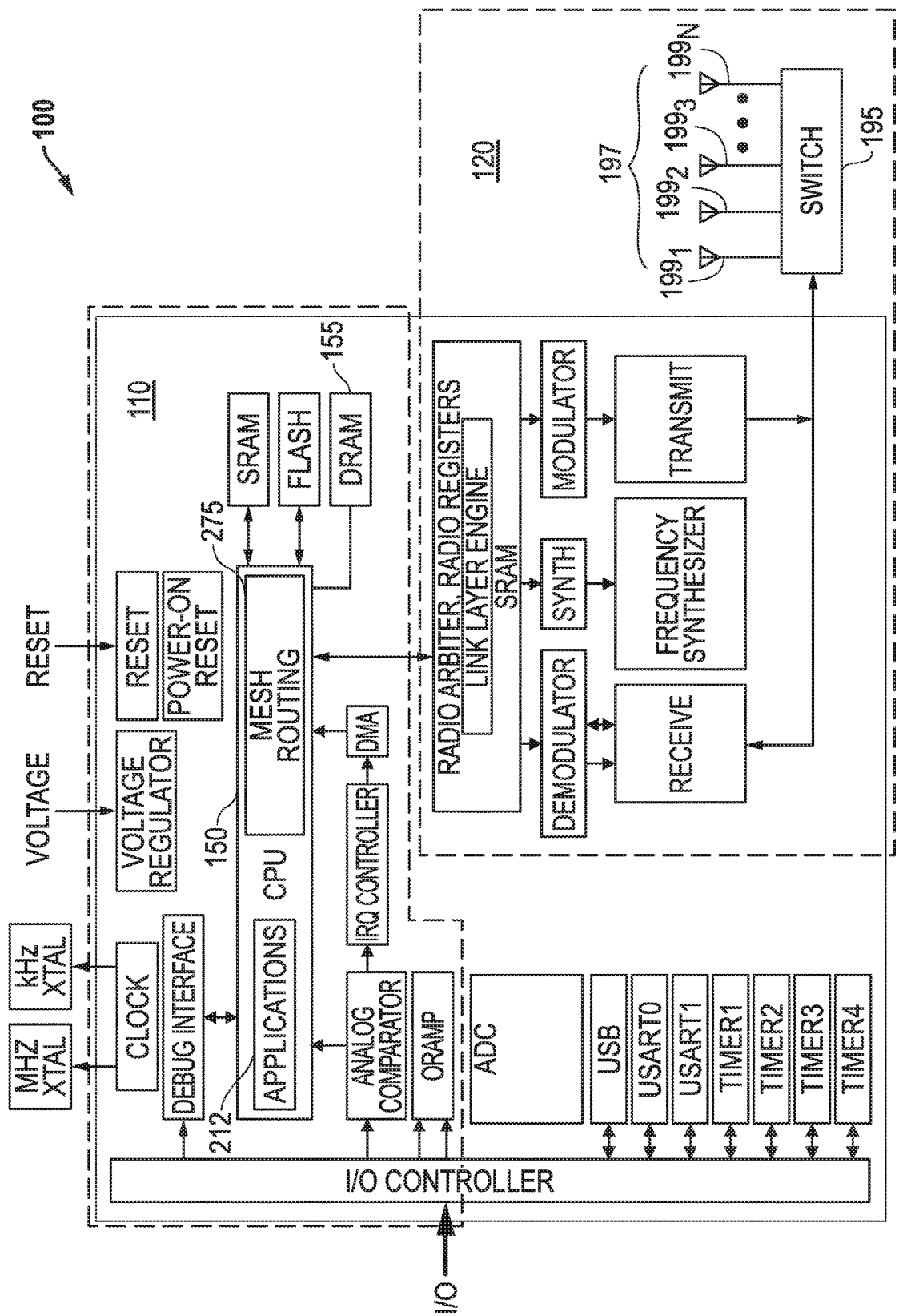
FIG. 1 illustrates a simplified block diagram of a wireless device according to one exemplary embodiment of the disclosed systems and methods.

FIG. 1 illustrates a simplified block diagram of an exemplary wireless device in the form of a BLE module 100 that may be employed to implement the disclosed systems and methods as individual node devices of a BLE mesh network, it being understood that the disclosed systems and methods may be similarly implemented with other types of wireless mesh technologies or protocols besides BLE (e.g., such as Zigbee or IEEE 802.15.4-based wireless technologies) as well as in multiprotocol environments (e.g., such as to transfer Zigbee packets over a BLE connection in a multiprotocol environment). In one exemplary embodiment, all components of BLE module 100 may be implemented as a system on a chip (SoC) or integrated circuit that includes one or more optional antenna array/s 197 and one or more optional antenna switch/es 195 to support angle of arrival detection as further described herein. In another exemplary embodiment, BLE module 100 may be implemented as a system on a chip (SoC) or integrated circuit that includes all components of BLE module 100 except optional antenna array/s 197 and external switch/es 195, which may be externally coupled to other components of BLE module 100 or alternatively not present at all.

As shown in FIG. 1, BLE module 100 includes a first module segment 110 that includes one or more central processing units (CPUs), processors or other programmable integrated circuits 150 and memory 155 (e.g., DRAM) with application data. Application/s 212 may be executed by CPU 150 to provide multiple different resources (e.g., such as different Bluetooth services, security manager, parts of a Bluetooth service such as Bluetooth service characteristics, and/or any other computing or wireless operation services) to other connecting radio frequency (RF)-enabled devices across different wireless RF connections (e.g., such as different BLE wireless connections between different BLE devices). CPU 150 may also be programmed to execute mesh configuration logic 275 (e.g., as an application) as described further herein to create a wireless communication path by opening relatively low power wireless connections between selected BLE wireless nodes of a BLE mesh network based on one or more inter-node signal transmission characteristics measured between different pairs of nodes of the mesh network.

Still referring to FIG. 1, a second module segment 120 is configured to implement a part of a link layer and physical layer for radio module 100, and includes radio components and circuitry such as radio registers, link layer engine, modulator-demodulator, receiver and transmitter (transceiver), frequency synthesizer, balancing-unbalancing unit ("balun"), one or more antennas ("ant/s"). In one embodiment, second module segment 120 may include memory and one or more microcontrollers, processors, programmable logic devices (PLDs), or other programmable integrated circuits programmed or otherwise configured to execute one or more components of module segment 120, e.g., such as a link layer engine.

In one exemplary embodiment, the physical radio (RF) portion of module segment 120 may be configured to determine Received Signal Strength Indicator (RSSI) in order to measure a power of the received radio signal. The RSSI may be calculated from any packets in advertisement/broadcasting state or connected state. The determined RSSI may also be used, e.g., for approximating the distance between two BLE devices. When a packet is received from another BLE device by BLE module 100, a RSSI value may be determined from it, and used for determining the distance between BLE module 100 and the BLE device by using known distance determination algorithms. Further information on RSSI determination and distance determination may be found, for example, in U.S. patent Ser. No. 14/660,218, which is incorporated herein by reference in its entirety for all purposes.

In another exemplary embodiment, second module segment 120 may be additionally or alternatively configured to determine angle of arrival (AoA) of a signal received from another device (e.g., such as a BLE device). For example, multiple antenna elements $199_1$ to $199_N$ of second module segment 120 may be configured as a switched antenna array 197 or other suitable type of direction finding array that is coupled to integrated circuit components of second module 120 that are programmed to determine AoA of a signal received from another device by measuring amplitude and/or phase of the signal at each antenna element 199 in the antenna array 197, for example, as described in U.S. patent application Ser. No. 15/387,004 filed on Dec. 21, 2016 and in U.S. patent application Ser. No. 15/663,326 filed on Jul. 28, 2017, each of which is incorporated herein by reference in its entirety for all purposes. In one embodiment, angle of arrival (AoA) of a signal received from another device may be so determined using only a single antenna array 197 having multiple antenna elements 199, and in another exemplary embodiment processing components of second module 120 may be programmed to determine AoA of a signal received from another device based on a determined angle of departure (AoD) of the received signal from another BLE device as described in U.S. patent application Ser. No. 15/387,004 filed on Dec. 21, 2016 and in U.S. patent application Ser. No. 15/663,326 filed on Jul. 28, 2017, each of which is incorporated herein by reference in its entirety for all purposes.

In one embodiment the one or more programmable integrated circuits, memory, and clock circuitry of module segment 110 may be coupled to each other and to components of module segment 120 through a system bus interconnect or one or more other types of suitable communication media, including one or more electrical buses and/or intervening circuitry that provides electrical communications. In certain embodiments, memory of module segments 110 and 120 may contain instructions which, when executed by programmable integrated circuits of BLE module 100, enable the BLE module 100 to operate as a BLE device to perform the functions described herein. Memory of BLE module 100 may be implemented, for example, using one or more non-volatile memories (e.g., FLASH read-only-memories (ROMs), electrically programmable ROM (EPROMs), and/or other non-volatile memory devices) and/or one or more volatile memories (e.g., dynamic random access memories (DRAMs), static random access memories (SRAM) and/or other volatile memory devices).

Second module segment 120 includes circuitry that operates as a wireless interface for first module segment 110 and that is coupled to one or more antennas as shown. Second module segment 120 may include a radio that includes baseband processing, MAC (media access control) level processing, beamforming or TDOA processing, and/or other physical layer processing for BLE packet communications. The programmable integrated circuits of first module segment 110 and second module segment 120 may also read and write from the various system memory during operations, for example, to store packet information being received from or transmitted to another BLE device. Although not shown, BLE module 120 may also be coupled receive power from a power supply, which may be a battery or a connection to a permanent power source such as a AC mains wall outlet.

Figure 2:
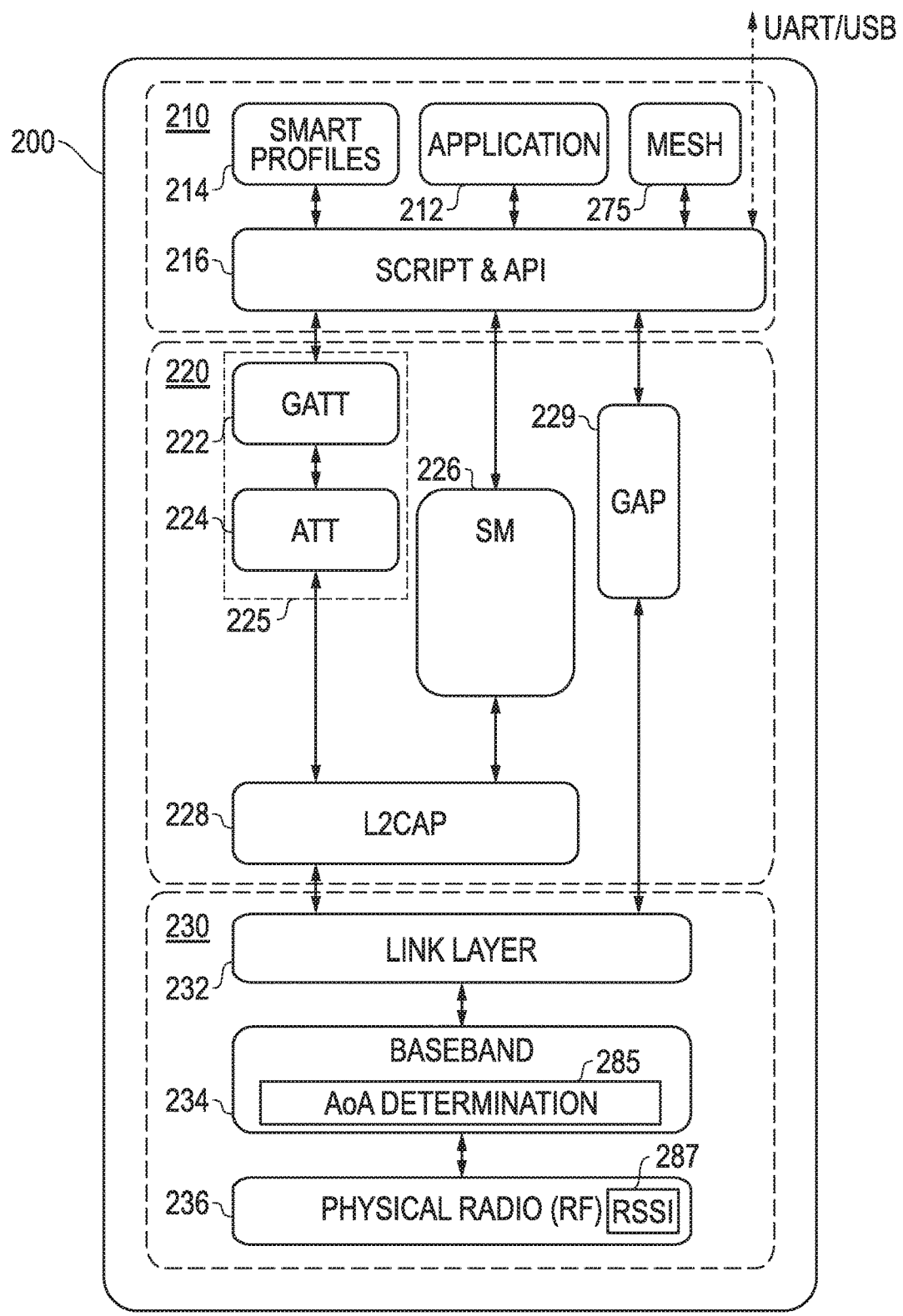
FIG. 2 is a simplified illustration of components of a Bluetooth smart module according to one exemplary embodiment of the disclosed systems and methods.

FIG. 2 is a simplified illustration of application, host and BLE control components of a Bluetooth smart module 200 configured according to one exemplary embodiment of the disclosed systems and methods. Components of Bluetooth smart module 200 may be implemented, for example, using the hardware components of radio module 100 or any other suitable combination of radio hardware components.

As shown in FIG. 2, Bluetooth smart module 200 of this embodiment includes application layer 210, host layer 220 and a Bluetooth (or BLE) controller 230. Application layer 210 may include, for example, apparatus-related application/s 212 (e.g., heart rate, proximity, blood pressure, time update, temperature, battery, lighting control, home automation control, etc.), smart profiles 214, and script and application programming interface (API) 216. Host layer 220 includes protocols running over the connection. Host layer 220 also includes data to be used in advertisement profile or Generic Attribute Profile (GATT) 222, generic access profile (GAP) 229, attribute protocol (ATT) 224, security manager (SM) 226 and logical link control and adaptation protocol (L2CAP) 228. Together GATT 222 and ATT 224 provide services 225 for Bluetooth smart module 200 that define an interface with other BLE devices connected to Bluetooth smart module 200 for reading and/or writing data for applications 212.

In one embodiment, application layer 210 of FIG. 2 may be capable of reading sensor data (e.g., from heart rate sensor, proximity sensor, temperature sensor, etc.), and reporting the data to host layer 220 for transmission using Bluetooth (or BLE) controller 230 from Bluetooth smart module 200 to one or more other BLE-enabled devices across one or more connections. In another embodiment, application layer 210 of Bluetooth smart module 200 may be additionally or alternatively capable of exchanging (receiving or transmitting) data, control and/or configuration information through host layer 220 and BLE controller 230 with other BLE-enabled devices across one or more connections.

As further shown in FIG. 2, Bluetooth (or BLE) controller 230 also includes link layer 232, baseband 234, and physical layer 236 (i.e., physical radio, radio frequency RF). Link layer 232 is present to provide ultra-low power idle mode operation and device discovery (i.e., connection mode and advertising mode handling). Link layer 232 is also configured to control packet transmission and response. Link layer 232 may be configured to support one or more connections or may in one embodiment be configured with multiple virtual link layers that are simultaneously operating, and a scheduler that is configured to control access of the virtual link layers to common radio resources of physical layer 236 through baseband 234 in a manner described in U.S. patent application Ser. No. 15/234,332 filed Aug. 11, 2016, which is incorporated herein by reference in its entirety for all purposes.

In one exemplary embodiment, processing components of second module 120 of FIG. 1 may implement demodulator or receiver component of baseband processor 234 of FIG. 2 and to sample a received signal. Processing components of first module 110 may be programmed to execute an application or other suitable programmed logic to perform determination of mesh configuration logic 275 of FIG. 2 using sampled information provided by processing components of first module 110. In this regard, mesh configuration logic 275 may be executed to measure and/or process one or more transmission characteristics of network signals received by BLE module 100 of FIG. 1 from one or more other BLE devices of a common BLE mesh network. Such inter-node signal transmission characteristics may include any characteristic of a signal received at a given BLE module 100 that is indicative of a direction from which the signal is received at BLE module 100, that is indicative of a spatial location of a device that transmitted the received signal to BLE module 100, and/or that is indicative of a strength of the signal as it is received at BLE module 100. Specific examples of such inter-node signal transmission characteristics but are not limited to, received signal strength indicator (RSSI), received signal decibel-milliwatts (dBm), Angle of Arrival (AoA), Angle of Departure (AoD), etc. It will be understood that functionality of mesh configuration logic 275 may be executed by one or more processing devices of BLE module 100, e.g., such as using one or more processing device/s of first module 110, one or more processing device/s of second module 120, and/or combinations of processing device/s of first module 110 and second module 120.

For example, physical radio (RF) 236 of a Bluetooth smart module 200 may be configured in one embodiment to determine and pass determined RSSI 287 upwards to mesh configuration determination logic 275. In another exemplary embodiment, AoA of a received signal may be determined by AoA determination logic 285 using any suitable technique, e.g., such as by using time difference of arrival (TDOA) techniques to measure the delay and/or or by measuring difference in received phase, of the received signal at each antenna element $199_1$ to $199_N$ in the antenna array 197 relative to another antenna element/s 199 in the antenna array 197 and which may include, for example, using switch 195 of FIG. 1 to switch through the different elements 199 of the array. At least a portion of such a received signal may be constant frequency to aid measurement of phase shift or TDOA between antenna elements of the array. In some embodiments direction of arrival (DOA) processing techniques such as MUltiple Signal Classification (MUSIC), Estimation of Signal Parameters Via Rotational Invariance Techniques (ESPRIT), etc. may be employed depending on the particular system configuration. It will be understood that in one embodiment, phase shift of a received signal may be performed by demodulator or receiver of baseband processor 234, and this determined phase shift information then passed upwards to a higher layer of BLE module 100 for AoA determination. In one embodiment, AoA determination logic 285 may also be programmed to determine AoD or other inter-node signal transmission characteristics, or AoA determination logic 285 may be replaced by suitable logic that only determines AoD or other inter-node signal transmission characteristic/s. In another alternate embodiment, AoA, AoD and/or other inter-node signal transmission characteristic/s may be determined by CPU 150 of first module 110 of FIG. 1, e.g., as an application/s executing in application layer 200 of FIG. 2.

Although exemplary embodiments are illustrated and described herein in relation to Bluetooth smart module 200 of FIG. 2, it will be understood that the disclosed systems and methods for mesh configuration may be implemented by any other one or more programmable integrated circuits of individual wireless devices. In this way, a wireless communication path may be created through a wireless mesh network as further described herein by opening relatively low power wireless connections between selected wireless nodes of the mesh network based on one or more inter-node signal transmission characteristics measured between different pairs of nodes of the mesh network.

Figure 3:
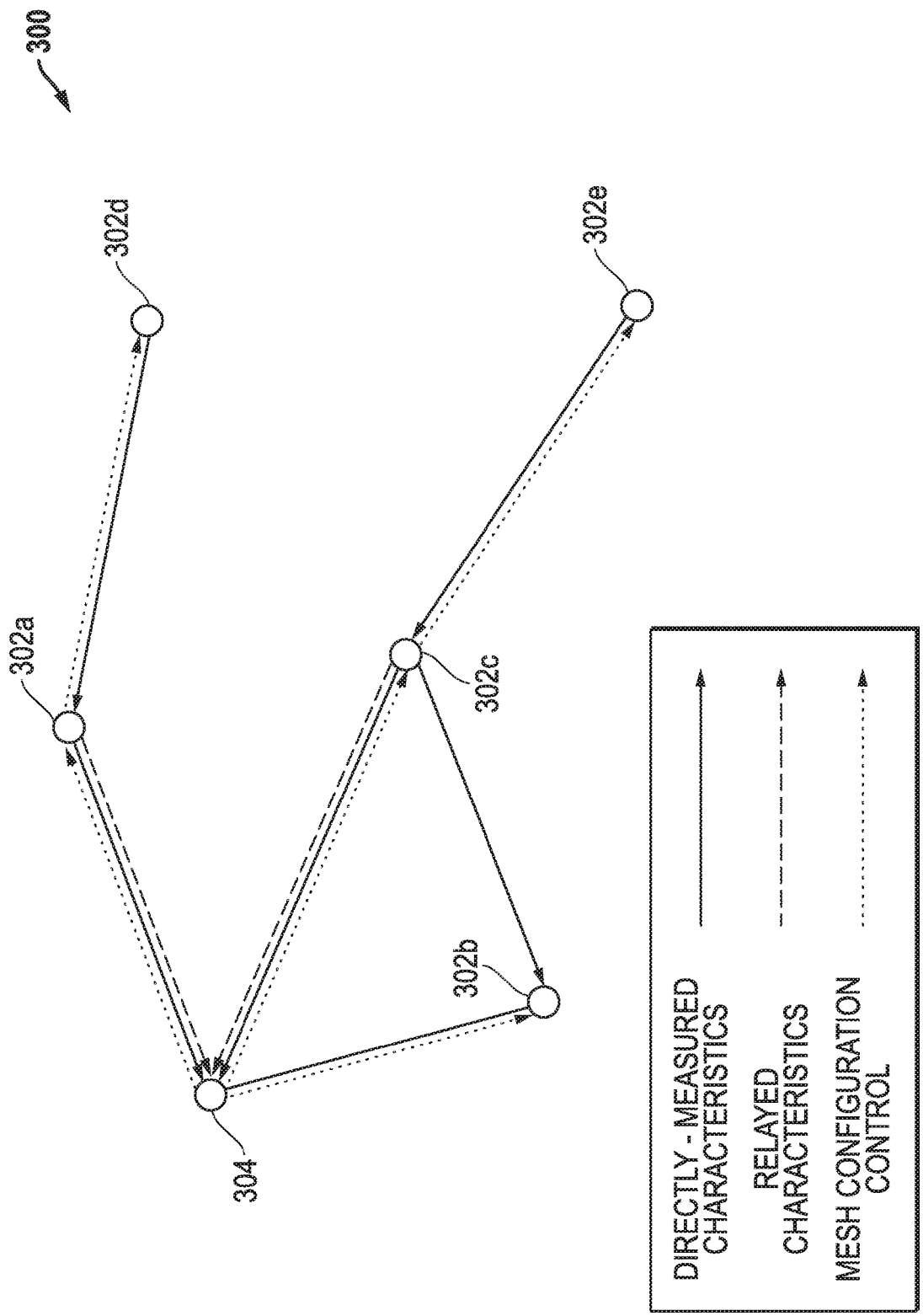
FIG. 3 illustrates a mesh network according to one exemplary embodiment of the disclosed systems and methods.

FIG. 3 illustrates one exemplary embodiment of a mesh network 300 that includes multiple network nodes 304 and 302a-302e. Each of nodes 304 and 302a-302e may be, for example, a wireless device that includes a BLE module 100 of FIG. 1. However, it will be understood that the disclosed systems and methods may be alternatively implemented with any other type of (non-BLE) wireless mesh network. In the embodiment of FIG. 3, network node 304 has been designated as a control node for mesh network 300 and may be, for example, a user device such as smart phone or tablet computer device including a BLE module 100 that implements smart Bluetooth module 200, although other types of BLE wireless devices may operate as a configuration node and/or any of nodes 302a-302e may be alternatively designated as a configuration node. In one embodiment, each of nodes 302a-302e may be a peripheral or Internet-of-things (IoT) wireless device, such as a wireless speaker, wireless temperature sensor, wireless motion sensor, wireless thermostat, wireless actuator, etc. It will be understood that any other one of network nodes 302a-302e may be alternatively designated as a control node in the embodiment of FIG. 3, and that a control node does need to be a user device such as smart phone or tablet computer.

Still referring to the embodiment of FIG. 3, control node 304 may receive from one or more of the other network nodes 302 transmitted signal packets that contain signal transmission characteristic information for signals received and measured at the location of these respective other network nodes 302. In this regard, mesh configuration logic 275 of one or more such other nodes 302 may cause transmission of this measured signal transmission characteristic information to mesh configuration logic 275 of designated control node 304, e.g., via one or more BLE broadcast advertising packets routed on broadcast/advertising channels through the broadcast mesh network, and/or by any other suitable communication such as directly to the control node via a broadcast advertising packet or a data packet transmitted during a connection to the control node 304 via data channel/s. As previously described, such signal transmission characteristic information may include any characteristic of a wireless signal received at each other network node 302 that is indicative of a direction from which the signal is received at the other node, that is indicative of a spatial location of a device that transmitted the received signal to the other node, that is indicative of a strength of the signal as it is received at the other node, etc.

It will be understood that a given control node 304 may also measure such inter-node signal transmission characteristics for signals received at the given node 304 directly from other nodes 302. For example, in the embodiment of FIG. 3, control node 304 is within wireless communication range of network nodes 302a, 302b and 302c, so as to allow direct wireless communication (e.g., BLE broadcast signals or BLE connection) between each of network nodes 302a, 302b and 302c and control node 304. This allows for direct measurement by configured node 304 of inter-node signal transmission characteristics of signals received directly from nodes 302a, 302b and 302c, as shown by solid line arrows in FIG. 3.

In FIG. 3, control node 304 is not within wireless communication range of network nodes 302d and 302e, and node 302a is not within wireless communication range of node 302c. However, node 302a is in wireless communication range of node 302d, and node 302c is in wireless communication range of node 302e. This allows direct measurement of inter-node signal transmission characteristics of signals that are received directly from node 302d by node 302a and allows direct measurement of inter-node signal transmission characteristics of signals that are received directly from node 302e by node 302c, as shown by solid line arrows in FIG. 3. Moreover, since nodes 302b and 302c are within wireless communication range of each other, direct measurement of inter-node signal transmission characteristics of signals transmitted between nodes 302b and 302c may also be made, e.g., in one direction in FIG. 3 although measurements may optionally be made both ways. As further shown by the dashed line arrows in FIG. 3, node 302a may relay (e.g., via BLE mesh broadcast signals) the measured inter-node signal transmission characteristics of the node 302d signals to control node 304, node 302c may relay measured inter-node signal transmission characteristics of the node 302e and node 302b signals to control node 304, and node 302b may relay measured inter-node signal transmission characteristics of the node 302c signals to control node 304.

In one embodiment, mesh configuration logic 275 of a control node 304 may in turn use the directly measured inter-node signal transmission characteristics at control node 304 together with any relayed measured inter-node signal transmission characteristics received from other mesh nodes 302 of network 300 to determine particular non-broadcast inter-node connection routing paths (or alternatively inter-node broadcast routing paths) to be set up between pairs of individual network nodes 304 and 302 of the wireless network 300 as described further herein. For example, the control node 304 may determine non-broadcast inter-node connection paths or inter-node broadcast routing paths based on one or more of determined signal strength (RSSI) or other signal strength measurement of received signals at node 304 and at other nodes 302 within the mesh network 300, calculated spatial location and/or relative positioning of nodes 304 and 302 to each other within network 300, calculated orientation of node 304 and other nodes 302 within the mesh network 300, etc.

In one exemplary embodiment, mesh configuration logic 275 of a control node 304 may determine position and/or orientation of each of nodes 304 and 302 within the mesh network 300 relative to each other and use this information to determine optimized or optimum non-broadcast BLE connection paths or inter-node broadcast routing paths between pairs of individual BLE device nodes of the wireless mesh network. Mesh configuration logic 275 of control node 304 may implement the determined optimized or optimum non-broadcast BLE connection paths or inter-node broadcast routing paths by providing mesh communication control information in packets transmitted from control node 304 to mesh configuration logic 275 of each of other nodes 302a-302e, as illustrated by the dotted line arrows in FIG. 3. Where necessary, packets containing mesh communication control information may be relayed (e.g., using BLE mesh broadcast signals) by intermediary nodes 302a and 302c from control node 304 to target nodes 302d and 302e that are out of communication range of control node 304. Otherwise packets containing mesh communication control information may be transmitted directly by (e.g., BLE broadcast signals) to target nodes 302a to 302c that are in wireless communication range with control node 304.

In one embodiment, packets containing mesh communication control information that are transmitted from control node 304 may include mesh communication control information for one or more target nodes 302a to 302e, e.g., such as identity of one or more connecting nodes to which each target node 302 is to establish a mesh connection, as well as the pre-connection role (scanner or advertiser) and connection role (master or slave) that each target role is to play relative to each identified connecting node to establish a connection. Mesh configuration logic 275 of each of other nodes 302a-302e may respond to the received packets from mesh configuration logic 275 of control node 304 by processing the included mesh communication control information and directing each given node 302 to establish a connection with one or more other specific given nodes 302 of mesh network 300 as specified by the mesh communication control information. The mesh communication control information may be stored in non-volatile memory of each node 302 for use during mesh network communications. Examples of mesh communication control information include, but are not limited to, Mesh gateway information, mesh communication control information, etc.

In another exemplary embodiment, a designated control node 304 of FIG. 3 may read out and store inter-node signal transmission characteristics measured by each of the out-of-range nodes 302d and 302e of the mesh network 300 by direct wireless communication (e.g., direct broadcast or connection link) while control node 304 is temporarily positioned in communication range of nodes 302d and 302e, e.g., during system installation, when a given new node is added to the network, or at any other time. For example, in the embodiment of FIG. 3 designated control node 304 may be moved and temporarily placed (e.g., by a user) to be within wireless communication range of each of the other given nodes 302d and 302e of the mesh network 300 for long enough to directly read out the inter-node signal transmission characteristics of a transmitted signal from node 302a that has been measured by node 302d, and to directly read out the inter-node signal transmission characteristics of a transmitted signal from node 302c that has been measured by node 302e. Control node 304 may store the these measured signal transmission characteristics transferred from nodes 302a and 302c in its internal non-volatile memory for future use. In this way a control node 304 need not be in wireless communication range of all network nodes at the same time.

In the above-described embodiment, a control node 304 does not need to be within wireless communication range of all of the other given nodes 302 at the same time but, for example, may be moved by a user from node 302 to node 302 when needed to obtain inter-node signal transmission characteristics and/or any other mesh configuration information from each node. In another embodiment, mesh communication control information may be similarly transferred directly from control node 304 to each of other given nodes 302d and 302e while control node 304 is temporarily placed within wireless communication range of each of nodes 302d and 302e. In such a case, each of nodes 302d and 302e may store the mesh communication control information in its internal non-volatile memory for future use.

Figure 4A:
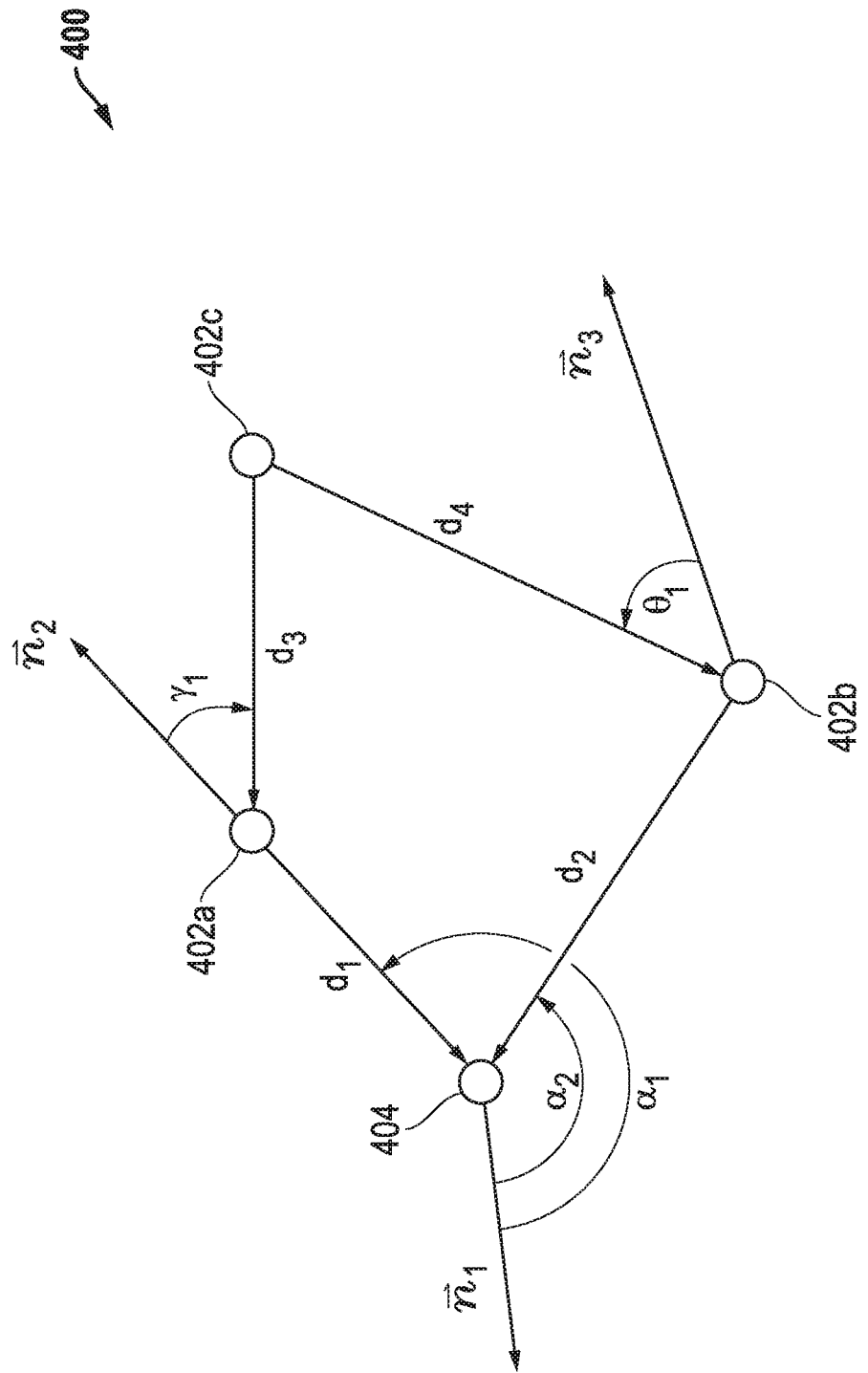
FIG. 4A illustrates a mesh network according to one exemplary embodiment of the disclosed systems and methods.

FIG. 4A illustrates another exemplary embodiment of mesh network 400 that includes four wireless (e.g., BLE) nodes 404 and 402a to 402c. In this embodiment, a control node 404 is in direct wireless communication range of two other wireless nodes 402a and 402b. A fourth wireless node 402c is out of direct wireless communication range with control node 404, but is in direct wireless communication range with each of nodes 402a and 402b as shown. In FIG. 4A, control node 404 measures AoA ($\alpha$) and distance (d) from the transmitter of each signal directly received from another node 402. In the illustrated case, AoA ($\alpha$) may be measured relative to an orientation (reference vector $\vec{n1}$) of control node 404, while d may be determined based on RSSI or other measurement of signal strength received at control node 404 directly from another node 402 (it is noted that RSSI measurement of this signal may be utilized without calculating a value of inter-node distance d). Thus in the example of FIG. 4A, control node 404 measures AoA ($\alpha_1$) and distance $d_1$ (or $RSSI_1$) for a signal received directly from wireless node 402a. Similarly, control node 404 measures AoA ($\alpha_2$) and distance $d_2$ (or $RSSI_2$) for a signal received directly from wireless node 402b. As also shown, node 402a measures AoA ($\gamma_1$) relative to its orientation reference vector $\vec{n2}$ and distance $d_3$ (or $RSSI_3$) for a signal received directly from wireless node 402c, and node 402b measures AoA ($\theta_1$) relative to its orientation reference vector $\vec{n3}$ and distance $d_4$ (or $RSSI_4$) for a signal received directly from wireless node 402c.

Although not shown in FIG. 3, it will be understood that node 402c may additionally or alternatively make similar signal transmission characteristic measurements (e.g., AoA and distance or RSSI measurements) for a signal received directly from node 402b, and that other nodes 402a and 402b may similarly make such measurements of signals received directly from control node 404 and/or any other node of the mesh network 400 which is in wireless communication range. Values of inter-node signal transmission characteristics measured at nodes 402a, 402b and/or 402c may be transmitted to control node 404 as previously described. Although not necessary, inter-node signal transmission characteristics may be optionally measured in one embodiment at both nodes of a node pair (e.g., signal transmission characteristics between node 404 and 402a may be measured in both directions at node 404 and at node 402a), for example, to increase measurement robustness in the presence of interference. It will be understood that additional or alternative inter-node signal transmission characteristics may be measured, e.g., such as AoD and/or others.

Figure 4B:
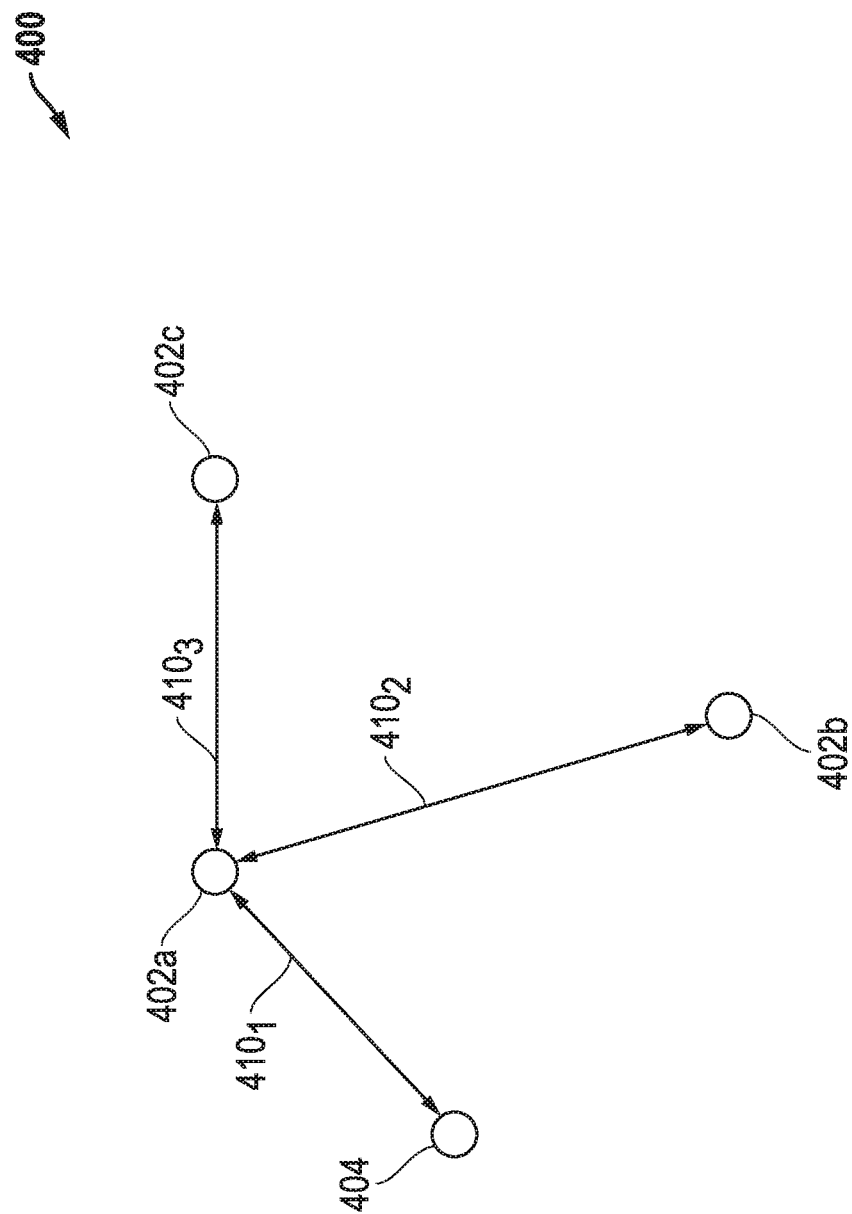
FIG. 4B illustrates a mesh network according to one exemplary embodiment of the disclosed systems and methods.

FIG. 4B illustrates resulting (e.g., optimized or optimal) non-broadcast node-to-node connection paths 410 established between pairs of individual network nodes 404 and 402a-402c that have been determined by mesh configuration logic 275 of control node 404 based on the measured signal transmission characteristics described in relation to FIG. 4A. In this case it is determined that a non-broadcast inter-node mesh connection $410_1$ is to be established between node 402a and control node 404, and that respective non-broadcast mesh connections $410_2$ and $410_3$ are to be established between node 402a and each of nodes 402b and 402c, respectively. Control node 404 forwards mesh communication control information to direct nodes 402a to 402c to establish these indicated connections 410, i.e., directly via broadcast mesh communication to each of wireless nodes 402a and 402b, and indirectly via broadcast communication to 402c through either intermediary node 402a or node 402b. Each of nodes 402a to 402c then respond to the mesh communication control information from control node 404 by establishing the connections 410 illustrated in FIG. 4B, i.e., so that all mesh communications will be routed in the future between nodes 404 and 402a to 402c using these established relatively lower power connections 410, rather than using relatively higher power conventional broadcast mesh communications between these nodes.

In one embodiment only measured RSSI or other signal strength measurement values between individual network nodes may be measured and/or utilized to determine inter-node connection pairs. For example, the determined non-broadcast inter-node communication paths $410_1$, $410_2$ and $410_3$ may be determined based only on the greatest RSSI values measured between the four nodes of FIG. 4A, e.g., the top three greatest RSSI values of all measured. In another exemplary embodiment, the determined inter-node communication paths $410_1$, $410_2$ and $410_3$ may be determined to be only those RSSI values measured between network node pairs that meets or exceeds a pre-defined minimum threshold RSSI value, in which case one or more network nodes may be omitted from the selected mesh communication if they are not within close enough communication range with another network node to have a RSSI value with another node that meets or exceeds the pre-defined minimum threshold value. In another exemplary embodiment, combinations of AoA and RSSI and/or other signal transmission characteristics may be employed as further described with regard to FIGS. 5A-5J and FIG. 6.

FIG. 5A illustrates another exemplary embodiment of a mesh network 500 that includes five randomly placed multiple network nodes 504 and 502a-502d that in this example are not aligned in any way with each other and there is no concept of a common "North". As in the case of the embodiments of FIGS. 3 and 4, each of nodes 504 and 502a-502d of FIG. 5A may be, for example, a wireless device that includes a BLE module 100 of FIG. 1. However, as previously stated, the disclosed systems and methods may be alternatively implemented with any other type of (non-BLE) wireless mesh network. In the embodiment of FIG. 5A, network node 504 has been designated as a control node for mesh network 500. In the embodiment of FIG. 5A, control node 504 is within wireless communication range of each of other nodes 502a-502c, but is not within wireless communication range of node 502d. However, each of nodes 502a-502d are in wireless communication range of each other.

Figure 5B:
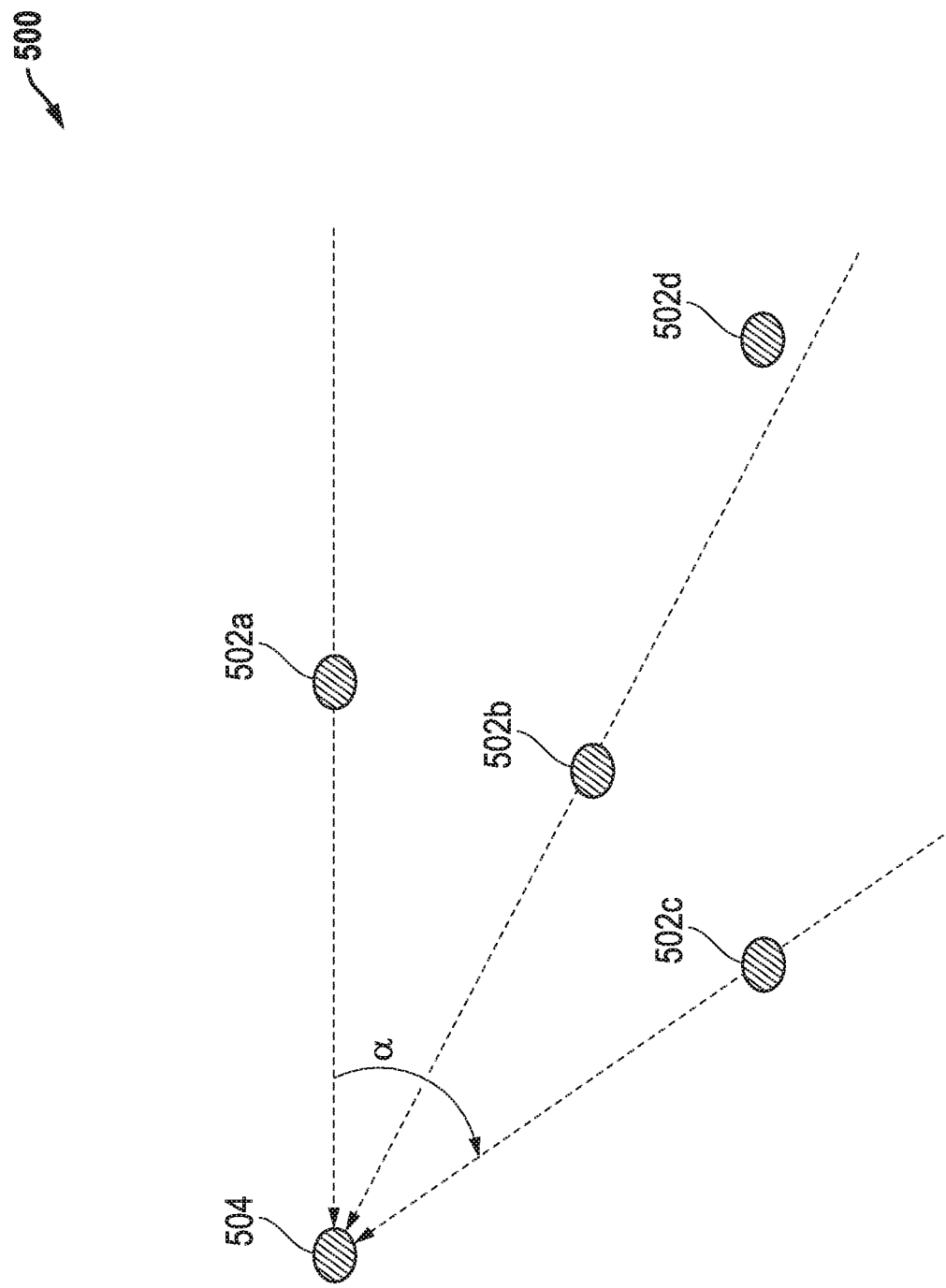
FIG. 5B illustrates a mesh network according to one exemplary embodiment of the disclosed systems and methods.
Figure 6:
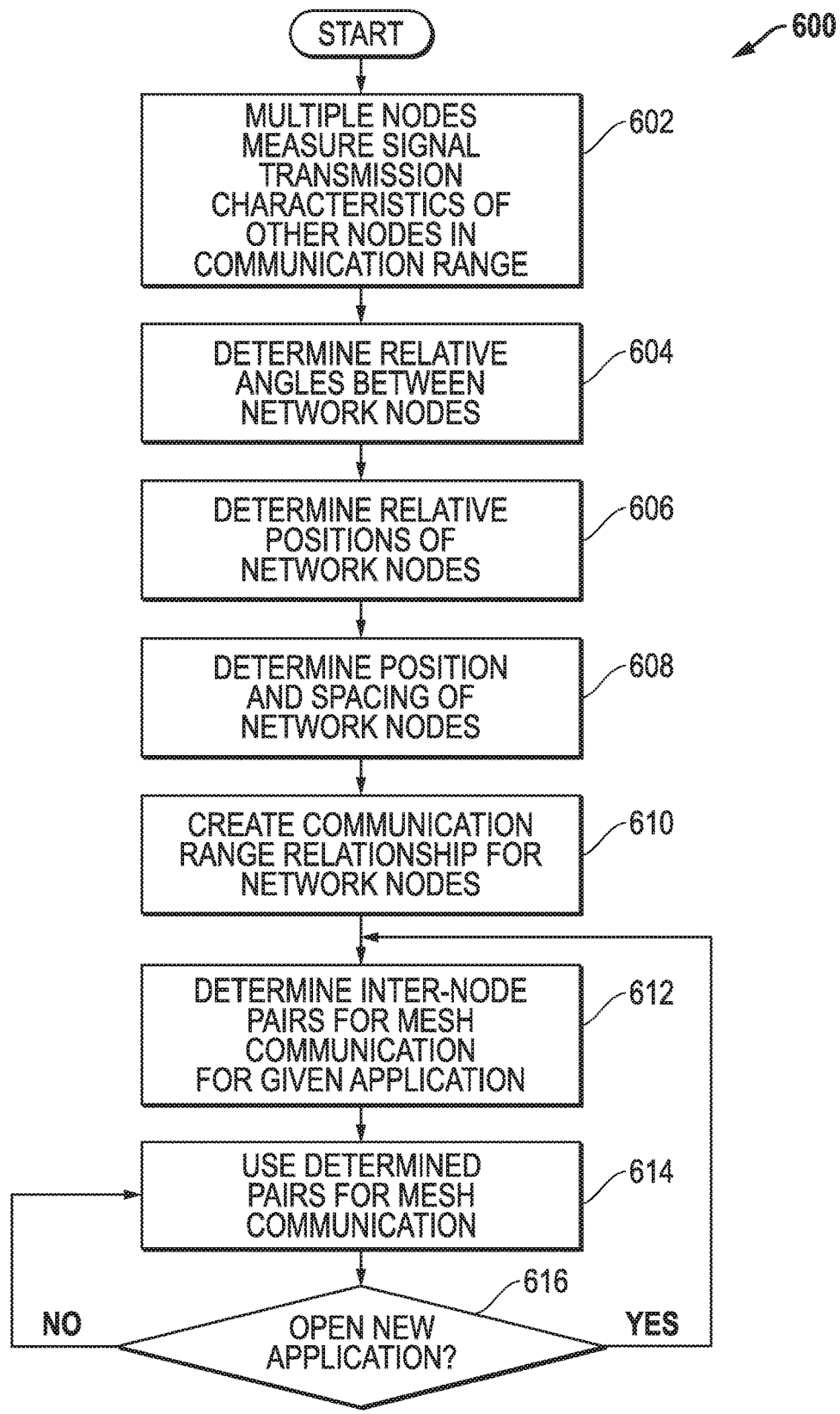
FIG. 6 illustrates methodology according to one exemplary embodiment of the disclosed systems and methods.

FIG. 6 illustrates one exemplary embodiment of methodology 600 that may be implemented by mesh configuration logic 275 of various wireless nodes to configure and form connections in a mesh network. Although methodology 600 may be employed in variety of different mesh network environments (e.g., having different numbers and/or pattern of wireless nodes, having different network protocols, etc.), FIG. 6 will be described in relation to the embodiment of FIG. 5A for purposes of example. In the case of methodology 600, only relative angle between the multiple nodes of FIG. 5A will be measured and determined. However, it will be understood that other signal transmission characteristics (e.g., such as signal strength in dBm or RSSI) may be measured and utilized to configure and establish mesh network connections in other embodiments.

As shown in FIG. 6, methodology 600 begins in step 602 where two or more (alternatively three or more, alternatively four or more, alternatively five or more) of wireless node 504 and 502a-502d may each observe and measure signal transmission characteristics of wireless signals (e.g., broadcast signal packets) received from other wireless nodes of network 500 that are within wireless communication range. This is illustrated in FIG. 5B where control node 504 measures AoA vector samples for signals received at control node 504 from each of other nodes 502a, 502b and 502c of FIG. 5A as illustrated by the dotted AoA vector lines in FIG. 5B. In this case, control node 504 does not observe or receive any signals from node 502d since it is out of wireless communication range with node 504 and thus is too far away to receive any signals from node 502d. In step 604, control node 504 may then determine the angle between one or more pairs of determined AoA vectors to each of three nodes 502a, 502b and 502c which is the relative angle between the directions to pair of different nodes. For example, in FIG. 5B control node 504 determines an angle (α) exists between the AoA vectors of nodes 502a and 502c as shown. In step 604, control node 504 may also determine the angle existing between AoA vectors of nodes 502a and 502b, and may determine the angle existing between AOA vectors of nodes 502b and 502c.

Returning to step 602, node 502c may measure AoA vector samples for signals received at node 502c from each of other nodes 504, 502a, 502b and 502d as shown in FIG. 5C. From this determined AoA information, node 502c (or control node 504) may determine in step 604 that an angle (β) exists between the AoA vectors of nodes 504 and 502a as shown. Similarly, node 502c (or control node 504) may also determine in step 604 the angle existing between AoA vectors of node 502c and each of nodes 502b and 502d, as well as the angle between AoA vectors of nodes 502a and 502b, and the angle between AoA vectors of nodes 502b and 502d. It will be understood that node 502c may transmit its measured signal transmission characteristics and/or determined relative angles to control node 504 as previously described for further processing to determine AoA vectors and angle determination for the location of node 502c. It will also be understood that in other embodiments a similar process may be employed in step 604 using AoA measurements made in step 602 at one or more additional nodes 502a, 502b and/or 502d as needed or desired to provide further relative angle information to determine the distance between individual nodes in a given pattern, and/or to be used for determining relative position of node 502e and/or other additional nodes that may be present in other embodiments.

Figure 5D:
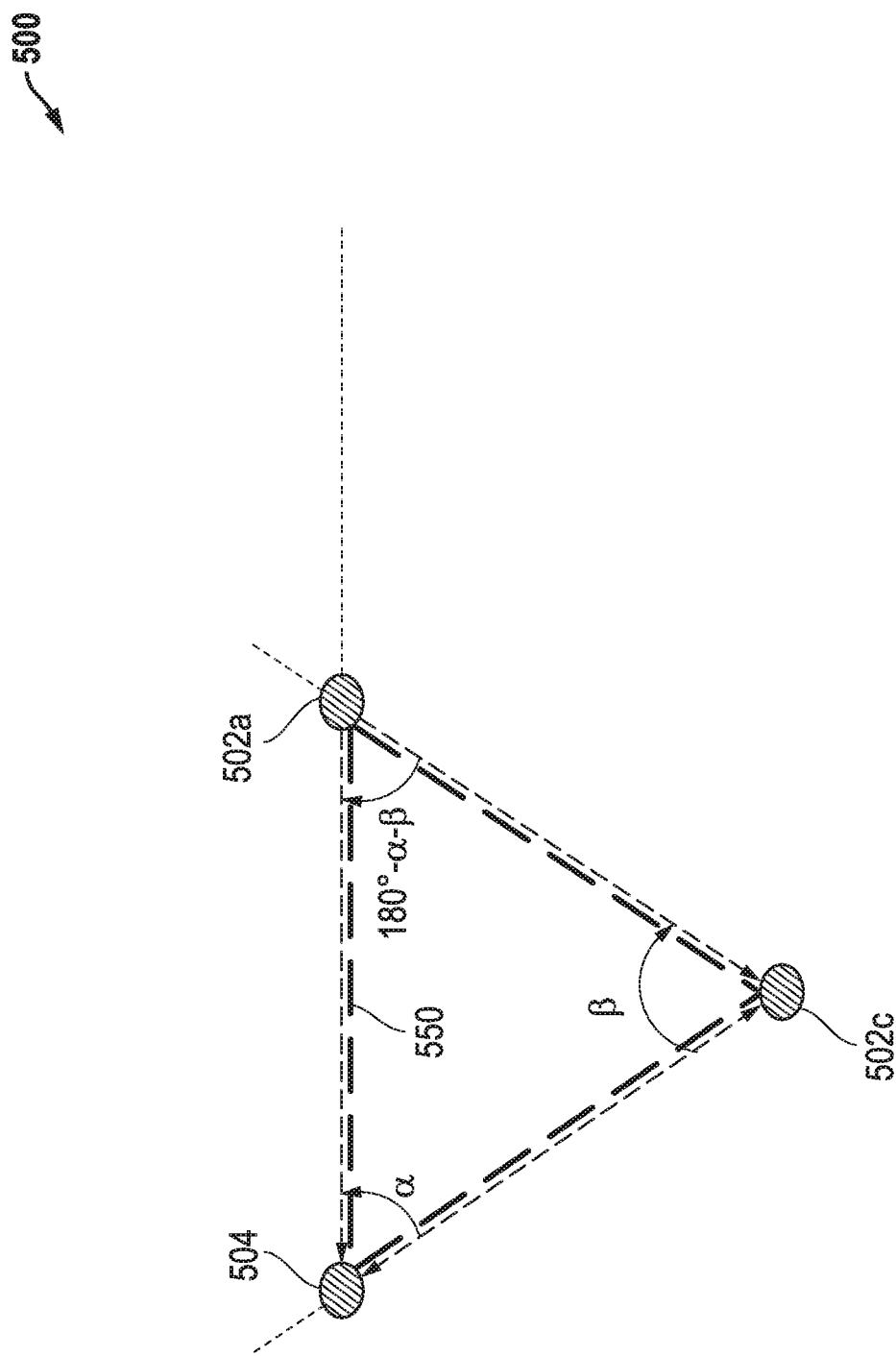
FIG. 5D illustrates a mesh network according to one exemplary embodiment of the disclosed systems and methods.

Next, in step 606, the position of at least a portion of the network nodes relative to each other may be determined (e.g., by control node 504) using combined relative angle sample data from multiple nodes of network 500. To illustrate, FIG. 5D illustrates a starting point for step 606 in which relative angle data samples determined at control node 504 and determined at node 302c (see FIGS. 5B and 5C) is combined to determine an additional angle between control node 504 and 502c relative to node 502a. As shown in FIG. 5D, relative angle between control node 504 and 502c at 502a may be determined by subtracting angle α of FIG. 5B and angle β of FIG. 5C from 180°, i.e., resulting in a first triangle 550 having corners that define the angles of nodes 504, 502a and 502c relative to each other as shown in FIG. 5D. This triangle 550 of FIG. 5D defines the positions of nodes 504, 502a and 502c relative to each other.

Figure 5E:
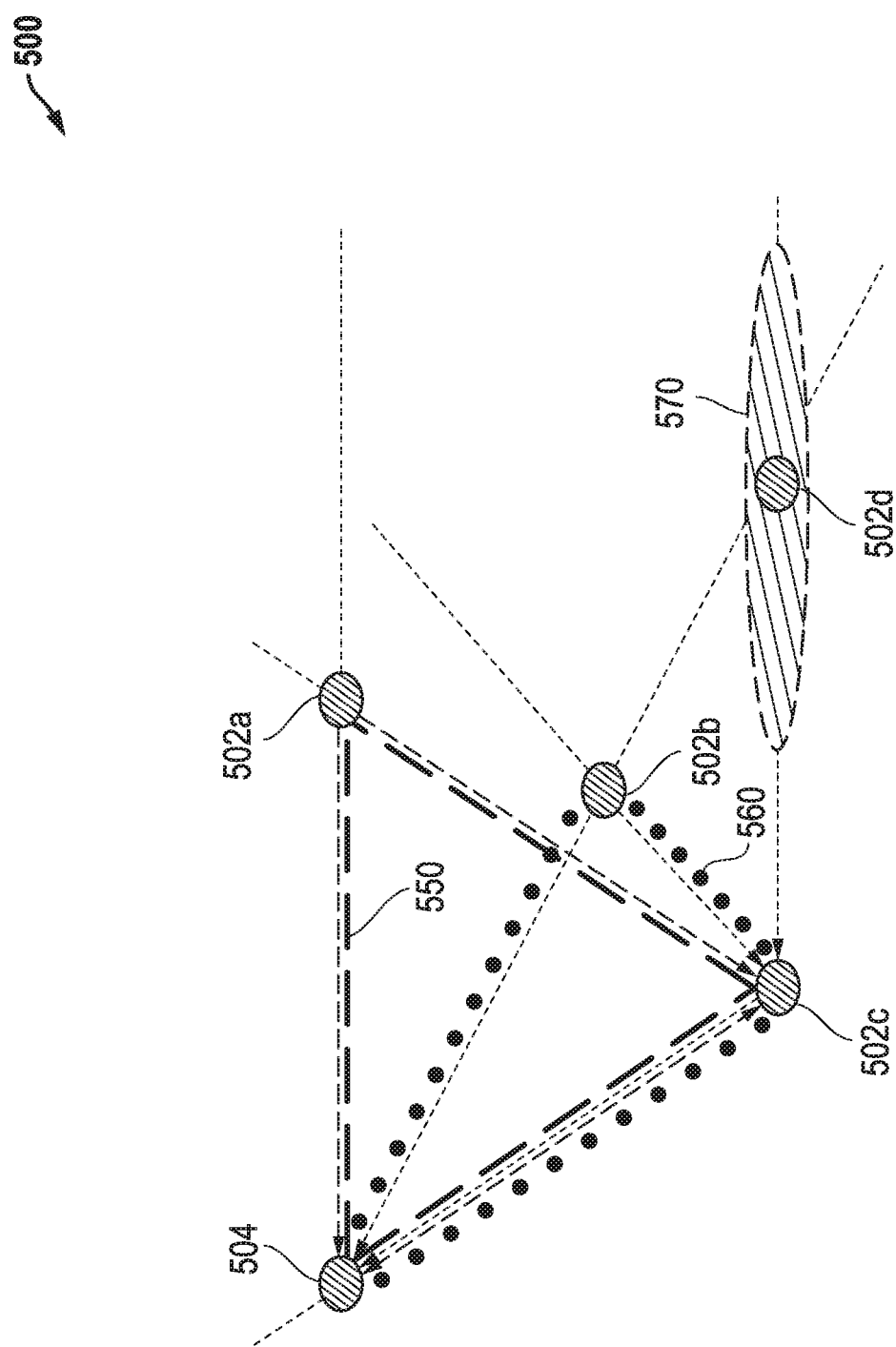
FIG. 5E illustrates a mesh network according to one exemplary embodiment of the disclosed systems and methods.

In this example, step 606 may proceed by then combining the known relative position samples of nodes 504, 502a and 502c with the remainder of the relative angle measurements made between AoA vector pairs at each of control node 504 and 502c to determine the position of all nodes in the network 500 relative to each other (with the exception of node 502d which is out of wireless communication range of all but node 502b). This determination is illustrated in FIG. 5E, where a similar angle-subtraction analysis may be made to result in a second triangle 560 that defines the positions of nodes 504, 502b and 502c relative to each other. Thus, the relative position of nodes 504, 502a, 502b and 502c to each other may then be determined in step 606 by combining intersecting triangles 550 and 560 as shown in FIG. 5E. In this example, AoA samples made at only two nodes (e.g., 504 and 502c) are thus sufficient to determine relative positions (or node topology without inter-node spacing) of four nodes 504 and 502a-502c in network 500. However, distance between the individual nodes is not known so that a variety of possible distance solutions exist between the nodes 504 and 502a-502c of FIG. 5E, which is illustrated by the more closely-spaced but equally valid-spaced pattern of nodes 504 and 502a-502c of FIG. 5F.

In one embodiment, inter-node distance-indicative measurement of received signals (e.g., such as RSSI, received signal dBm measurement, etc.) may be made to measure the distance between the nodes in FIG. 5E, which may be combined with the results of FIG. 5E to increase accuracy of the relative position measurement for use in determining non-broadcast node-to-node connection routing pairs (or alternatively broadcast routing pairs) through network 500. It is also noted that in FIGS. 5E and 5F, the relative position of node 502d is not known since there is only one available AoA sample for node 502d since it is only in wireless communication range with one node (502c). This is indicated by a zone 570 of uncertainty for node 502d, in which only the direction of node 502d is known.

Figure 5G:
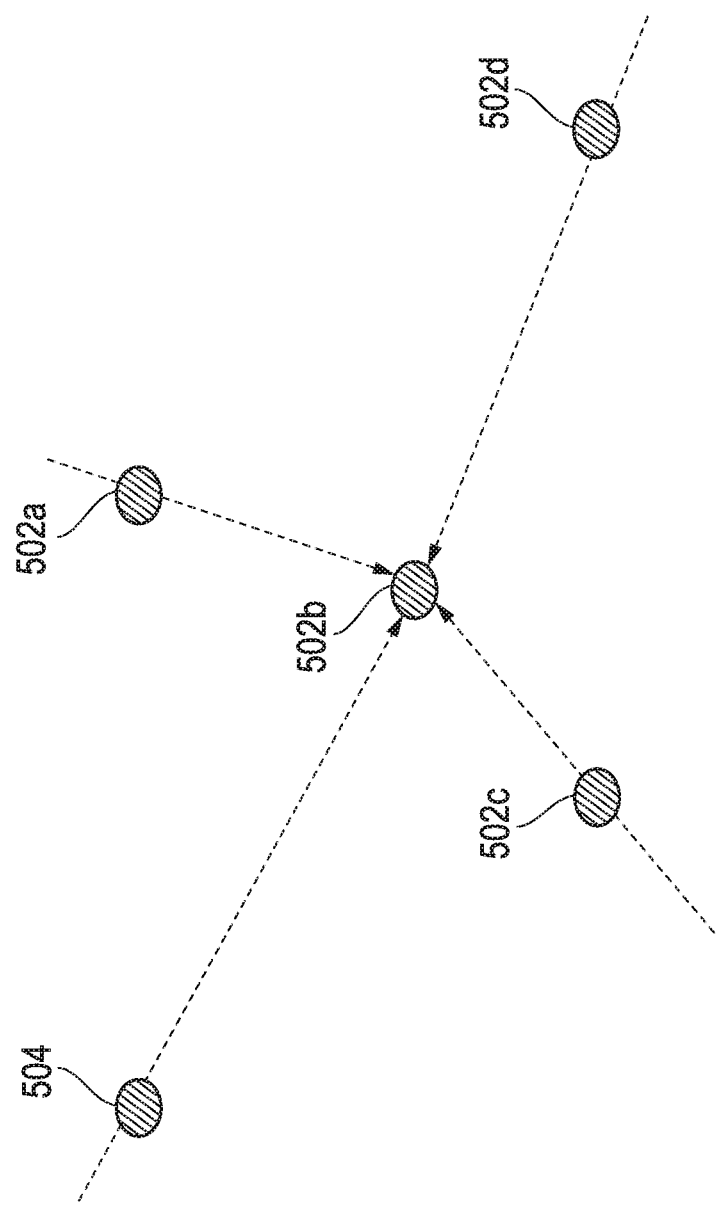
FIG. 5G illustrates a mesh network according to one exemplary embodiment of the disclosed systems and methods.

Referring now to FIG. 5G, node 502b may also measure AoA vector samples for signals received at node 502b from each of other nodes 504, 502a, 502c and 502d in step 602 as shown in FIG. 5G. From this additional determined AoA information, node 502d (or control node 504) may determine relative angles in step 604 between the AoA vectors of nodes 504, 502a, 502c and 502d in a manner as previously described. In such an embodiment, step 606 may proceed by using a similar angle-subtraction analysis as described previously to result in a third triangle 580 that defines the positions of nodes 504, 502a and 502b relative to each other, and fourth triangle 590 that defines the positions of nodes 502b, 502c and 502d relative to each other.

Figure 5H:
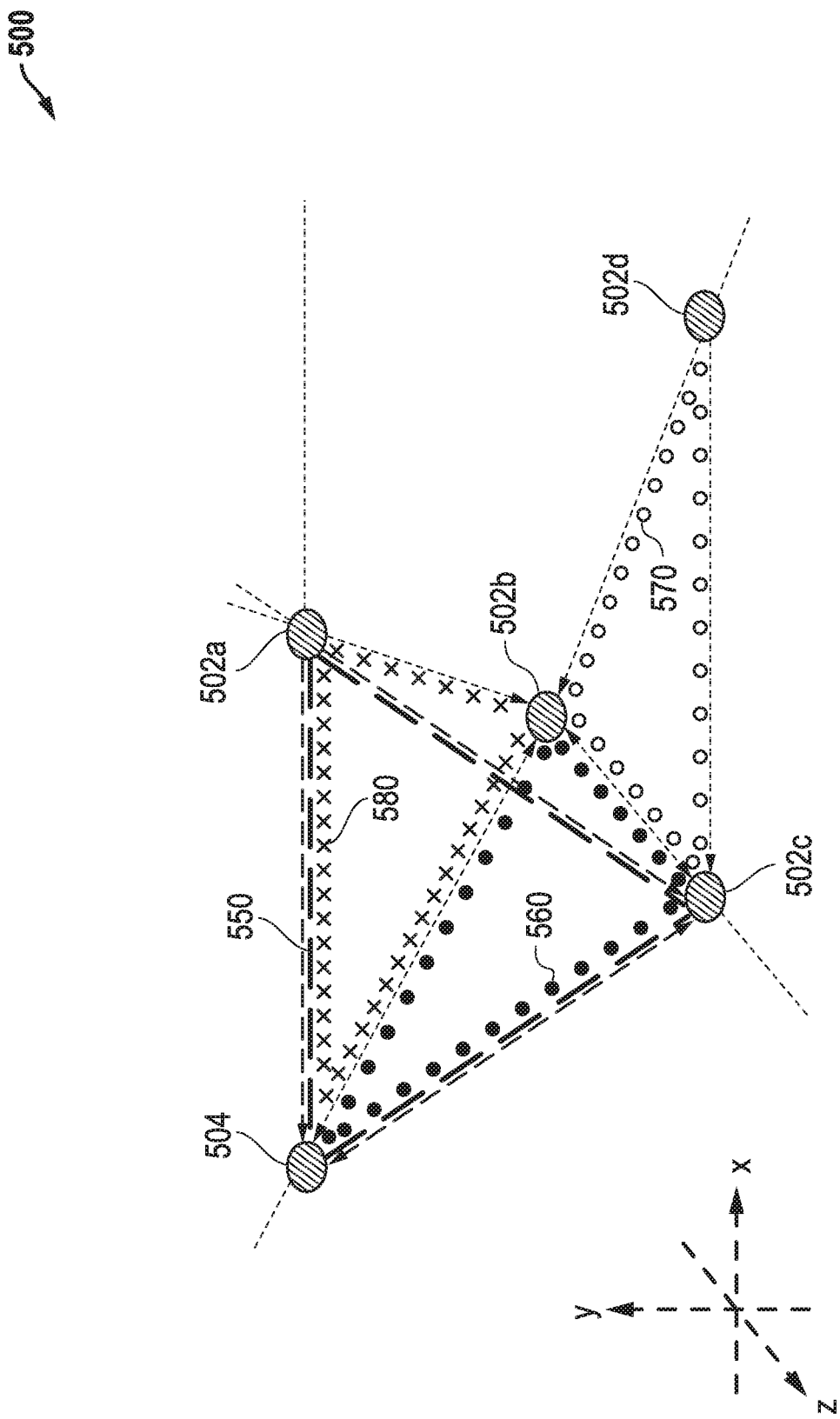
FIG. 5H illustrates a mesh network according to one exemplary embodiment of the disclosed systems and methods.
Figure 5I:
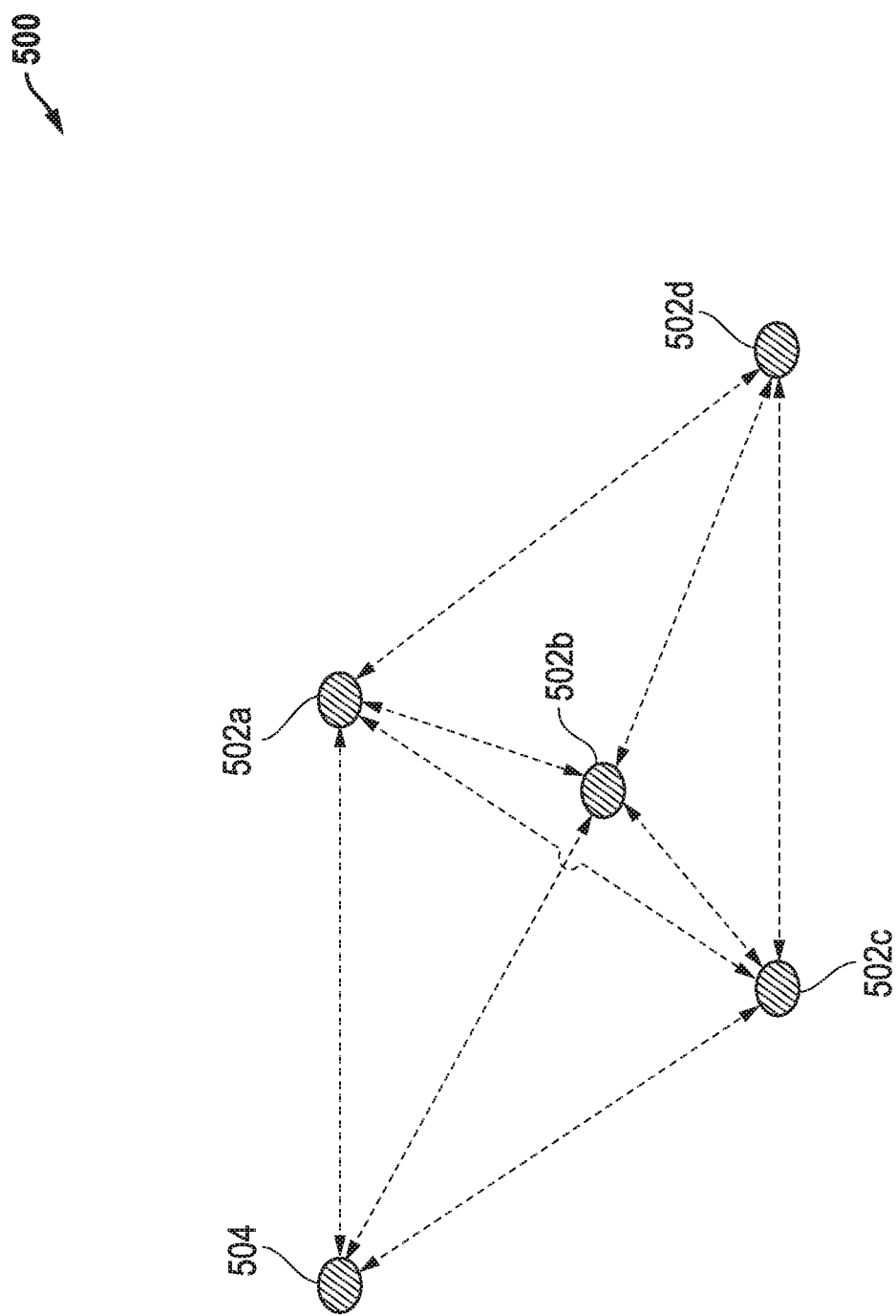
FIG. 5I illustrates a mesh network according to one exemplary embodiment of the disclosed systems and methods.

Next in step 608, the AoA sample data made at three nodes 504, 502c and 502b may be used together with inter-node distance-indicative measurements of signals received at nodes 504, 502c and 502b (e.g., such as RSSI, received signal dBm measurement, etc.) to create four interesting triangles 550, 560, 570 and 580 that may be combined to create a three-dimensional (x-y-z) graph (or mathematical node position representation) of network nodes with known distance (spacing), angle, and direction between each pair of individual nodes of network 500 as illustrated in FIG. 5H. Thus, both the relative position and distance spacing of nodes 504, 502a, 502b, 502c and 502d to each other may then be determined in step 606 by virtue of the intersection of combined triangles 550 and 560 as shown in FIG. 5H, including the position of node 502d which may now be located due to two AoA samples of its signal that are made at nodes 502b and 502c. Thus, AoA samples and inter-node distance-indicative measurements taken at three or more nodes (e.g., 504, 502b and 502c) are sufficient to determine relative position of, and spacing between, all five nodes 504 and 502a-502d in network 500, from which a three-dimensional (x-y-z) communication range relationship (graph or mathematical position representation) may be determined in step 610 as shown in FIG. 5I where the node topology has been "scaled" to proper size using inter-node distance-indicative measurements. In this regard, where relative distance between nodes 504 and 502c was not previously known, it may now be determined in step 608 as well as relative position of node 502d based on two AoA samples for node 502d.

In FIG. 5I, double-sided arrows between pairs of nodes of network 500 indicate that it has been determined that these node pairs are spaced within communication range of each other, e.g., as follows. In one embodiment, minimum communication range distance may be pre-defined (e.g., by empirical measurement of similar wireless node devices of the same wireless protocol such as BLE protocol during testing), and stored in non-volatile memory of control node 504. Mesh configuration logic 275 of control node 504 may then compare this predefined minimum communication range distance to the determined spacing between each pair of network nodes that is determined in step 608 to determine that a pair of network nodes is in wireless communication range where the determined pair spacing is less than or equal to the predefined minimum communication range distance. For example in FIG. 5I, node 502c is in wireless communication range to allow direct wireless communication with node 502a even though node 502b is positioned between nodes 502c and 502a. Moreover, it may be determined from FIG. 5I that node 502a is within wireless communication range to allow wireless communication with node 502d.

This information from the communication relationship of step 610 may be used by mesh configuration logic 275 of control node 504 to create a communication range table, e.g., that may be optionally passed from mesh configuration logic 275 of node 504 for storage in non-volatile memory and use by respective mesh configuration logic 275 of each given one of other nodes 502a-502d during mesh communications to determine optimal routing pairs for communication with that given node. Table 1 below illustrates an example of a communication range table that indicates with an "X" which nodes are in wireless communication range with each other in FIG. 5I. In the case of Table 1, nodes 504 and 502d are out of wireless communication range with each other. However, each other node 500a, 500b and 500c is capable of communicating with each other node of network 500, although this may not always be the case where some pairs of noes are out of wireless communication range with each other.

TABLE 1

Communication Range Table

|  | 504 | 502a | 502b | 502c | 502d |
|---|---|---|---|---|---|
| 504 | — | X | X | X |  |
| 502a | X | — | X | X | X |
| 502b | X | X | — | X | X |
| 502c | X | X | X | — | X |
| 502d |  | X | X | X | — |

Figure 5J:
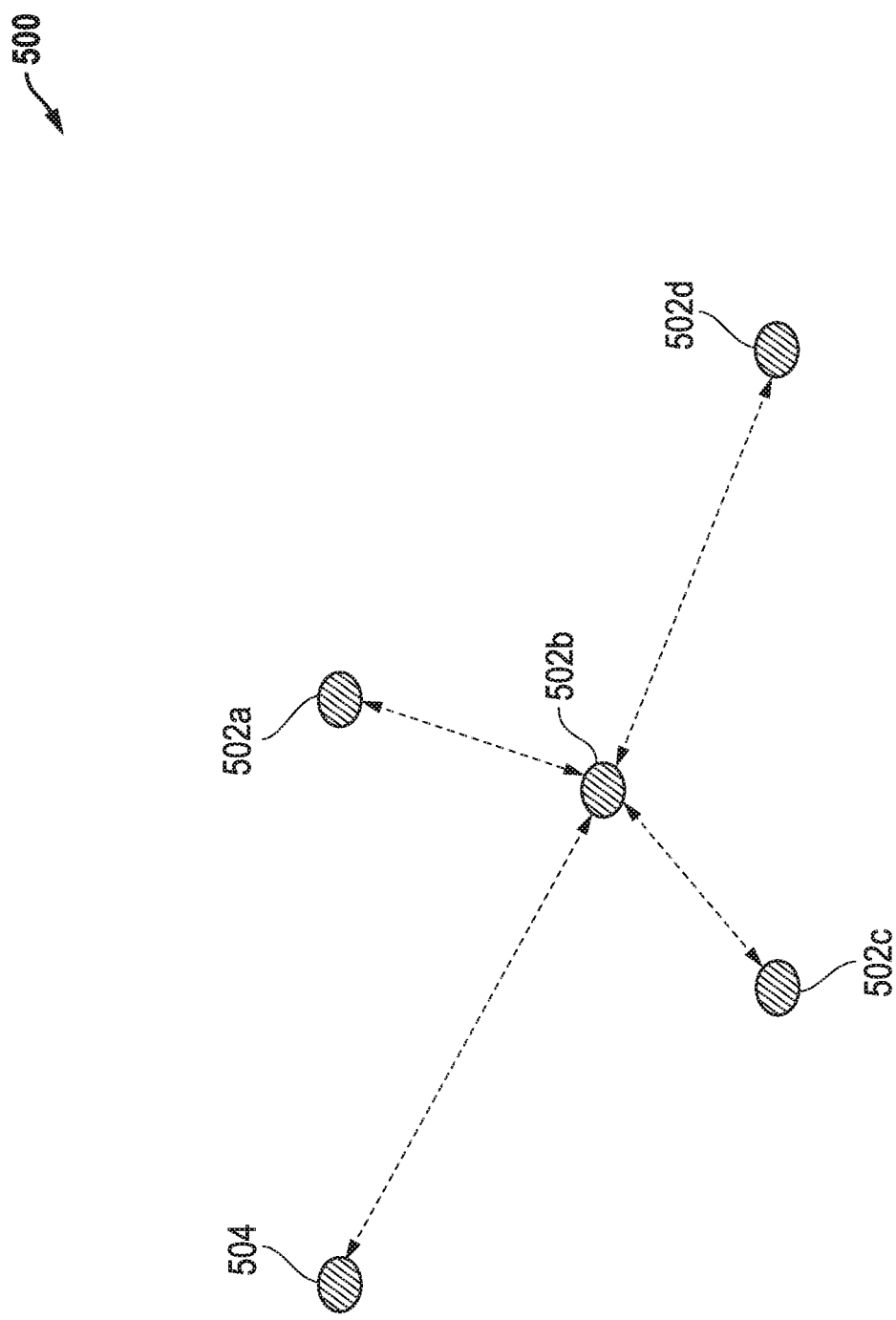
FIG. 5J illustrates a mesh network according to one exemplary embodiment of the disclosed systems and methods.

Next, in step 612, optimized or optimum mesh communication inter-node pairs to be employed for mesh communication may be determined, e.g., by mesh configuration logic 275 of node 504. In one embodiment, selection of mesh communication inter-node pairs in step 612 may be made based on determined communication range relationship information (e.g., Table 1) of step 610, as well as application characteristics such as roles (e.g., advertiser, broadcaster, scanner, etc.) and/or identity of network nodes to be used by the application, types and/or frequency of packets to be transmitted by the application, etc. FIG. 5J illustrates one example of designated non-broadcast inter-node connection pairs that have been selected to communicate with each other according a minimum spanning tree or minimum weight spanning tree which may be determined as a subset of the weighted edges (e.g., connected inter-node path lengths or distance) of the determined communication range relationship of FIG. 5I that connects all network nodes together without any cycles and with the minimum possible total edge weight (e.g., minimum total connection path length between the multiple network nodes). Example spanning tree algorithms include, but are not limited to, Borůvka's algorithm, Prim's algorithm, Kruskal's algorithm, reverse-delete algorithm, linear time randomized algorithm, Chazelle's algorithm, etc.

Table 2 illustrates example mesh communication control information in the form of mesh communication control information provided as a routing table of optimized inter-node pairs corresponding to FIG. 5J that have been designated for carrying out mesh communications between various network nodes of FIG. 5J, e.g., for a current application 212 being executed by one or more of the network nodes. In this regard, BLE connections for mesh communications will only be established in one embodiment between those pairs of nodes designated with an "X" in Table 2. This determined mesh communication inter-node pair information (e.g., routing table such as Table 2) may be passed from mesh configuration logic 275 of node 504 for storage in non-volatile memory and use by respective mesh configuration logic 275 of each of other nodes 502a-502d during mesh communications.

TABLE 2

Routing Table

|      | 504 | 502a | 502b | 502c | 502d |
|------|-----|------|------|------|------|
| 504  | —   |      | X    |      |      |
| 502a |     | —    | X    |      |      |
| 502b | X   | X    | —    | X    | X    |
| 502c |     |      | X    | —    |      |
| 502d |     |      | X    |      | —    |

In one embodiment of step 614, each given node of network 500 opens a normal BLE node-to-node non-broadcast connection to one or more designated neighboring nodes of network 500 that correspond to the designated inter-connection pair/s of FIG. 5J for that given node, and transfers mesh data over this established connection/s to the neighboring node/s. In this regard, non-broadcast inter-node connections may established for the currently-executing application 212 according to the determined mesh communication inter-node pair information from step 612, e.g., connections will only be formed between the node pairs designated by an "X" in Table 2 and connected by double-sided arrows in FIG. 5J. Each node then uses a relatively low power and low latency BLE connection to transmit mesh information to other nodes without the need for, or use of, relatively higher power broadcasting of packets to other nodes. In one embodiment the determined internode connection pairs from step 612 may be used in step 614 until a new and different application 212 is opened in step 616, at which point methodology 600 may repeat to step 612 and re-determine inter-connection node pairs for mesh communication between individual nodes based on the characteristics of the new application 212.

In yet another embodiment of methodology 600, a broadcast routing scheme may be implemented in which nodes of a mesh network 500 re-broadcast received packets (e.g., advertising packets) according to mesh communication control information in the form of determined mesh communication inter-node pair information, such as routing table of Table 2. In this alternate embodiment, non-broadcast node-to-node connections are not established between the nodes of the mesh network 500, nor do all nodes re-broadcast received packets under most circumstances. Rather, when a packet is broadcast by a first node of the network, only those receiving nodes that are paired with the broadcasting first node by the mesh communication inter-node pair information will re-broadcast the received packet. In such an embodiment, steps 602-612 of methodology 600 may be performed as previously described (e.g., by mesh configuration logic 275 that is executing on control node 504) to create communication range relationship information (e.g., such as Table 1) and mesh communication inter-node pair information (e.g., such as Table 2) which may be distributed to all nodes of the network 500, e.g., from control node 504. However, in step 614, the mesh communication inter-node pair information may be used to determine which nodes of a mesh network 500 re-broadcast a received broadcast packet.

Figure 7:
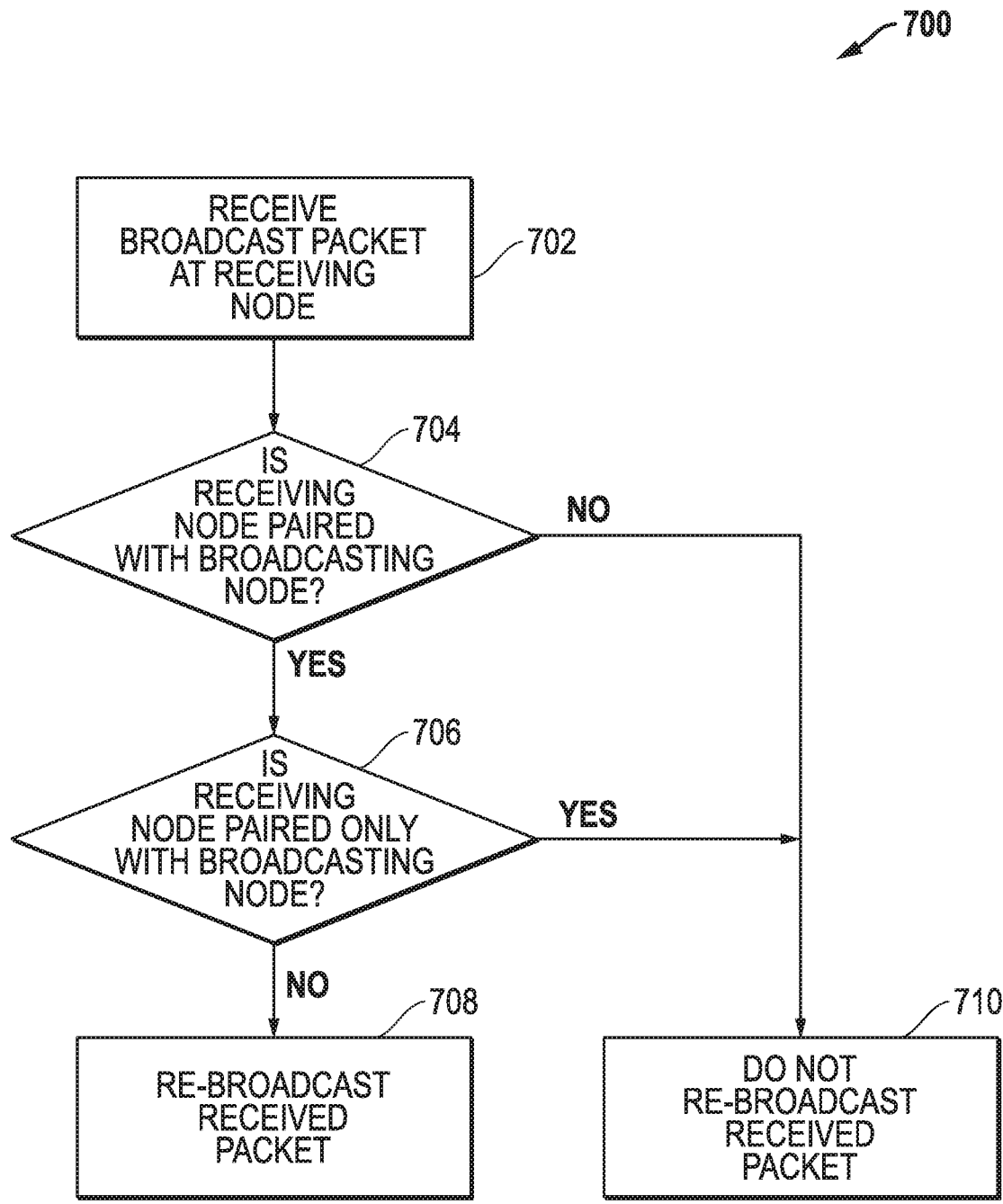
FIG. 7 illustrates methodology according to one exemplary embodiment of the disclosed systems and methods.

FIG. 5K illustrates operation of such an alternate broadcast routing scheme embodiment methodology 700 where node 504 broadcasts an advertising packet 575 that is received by each of nodes 502a, 502b and 502c (which are in wireless communication range of node 504), and that is not received by node 502d (which is not in wireless communication range of node 504). In the illustrated example, mesh configuration logic 275 executing on each receiving node may perform exemplary methodology of 700 of FIG. 7. As shown in FIG. 7, the receiving node receives the broadcast packet 575 at step 702 and then accesses the inter-node pairing information to determine in step 704 if the current broadcast packet 575 is received from a node that the receiving node is paired with according to routing Table 2. If so, then the receiving node will re-broadcast the received packet 575 in step 708 unless the receiving node is first determined in step 706 to be only paired with a broadcasting node/s from which it received the current broadcast packet 575. In this embodiment, if the receiving node is determined not to be paired with the broadcasting node in step 704 or if the receiving node is determined to be only paired with the node that broadcast the current broadcast packet 575, then the receiving node proceeds to step 710 and does not re-broadcast the current broadcast packet 575, it being understood that the order of steps 704 and 706 may be reversed or steps 704 and 706 may be performed simultaneously. In this way an advertisement-based mesh network may be established to broadcast a packet throughout multiple nodes of a mesh network while at the same time reducing or minimizing duplicative or unnecessary broadcast packet traffic in the network.

For example, in the illustrated case of FIG. 5K, node 502b will determine from routing Table 2 that it is indeed paired with broadcasting node 504, and will also determine that it is paired with other nodes 502a, 502c and 502d from which it did not receive the broadcast packet 575. Since both these conditions exist, then node 502b will re-broadcast the advertising packet 575 as shown. Each of nodes 502a and 502c will also receive the advertising packet 575 from node 504, but determine from Table 2 that it is not paired with node 504 and therefore not re-broadcast the packet 575 received from node 504. Each of nodes 502a, 502c and 502d will receive the re-broadcast advertising packet 575 from node 502b since they are in wireless communication range of node 502b. However, each of nodes 502a, 502c and 502d will determine from Table 2 that it is only paired with node 502b from which it received the packet 575 and thus will not re-broadcast packet 575 that is received from node 502b. In this way, broadcast packet traffic in network 500 may be reduced or minimized while at the same time the advertising packet 575 may be received by all nodes of routing Table 2.

It will be understood that methodologies 600 and 700 of FIGS. 6 and 7 are exemplary only, and that different combinations of fewer, additional, re-ordered and/or alternative steps may be employed in other embodiments. For example, in one embodiment step 612 may be performed to determine inter-connection node pairs for non-broadcast or broadcast mesh communications by all applications 212, i.e., without consideration of the characteristics of any given application 212. Step 616 would be absent from methodology 600 in such as case. In another embodiment, methodology 600 may be employed to establish minimum spanning tree or other inter-node pair relationships for non-mesh communications, e.g., such as normal BLE connections between nodes of network 500. In another embodiment, methodology 700 may be modified so that each receiving node of mesh 500 may determine whether to re-broadcast a received broadcast packet 575 based only on the determination of step 704 without performing step 706, i.e., a receiving node will re-broadcast a received packet 575 in step 708 if it determines that it is paired with a broadcasting node in step 704 regardless of whether or not it is paired with any other nodes from which it did not receive the broadcast packet 575.

In the implementation of BLE wireless communications, example advertising packet types that may be transmitted from an advertiser (or broadcaster) device include:
ADV_IND connectable and scannable undirected advertising event
ADV_DIRECT_IND connectable directed advertising event
ADV_NONCONN_IND non-connectable or non-scannable undirected advertising event
ADV_SCAN_IND scannable undirected (non-connectable) advertising event.

In BLE advertising (or broadcast state), an advertising device or broadcaster uses its link layer to control advertising packet transmit during recurring spaced advertising events. During each advertising event advertising packets are transmitted in round robin fashion on one advertising channel of three designated advertising channels at a time (BLE advertising channels 37, 38 and 39), one or more of which may be received by a link layer of a scanning (or observer) device that is listening on the different advertising channels one at a time. The link layer of the advertising (or broadcaster) device may use packet transmission timing parameters to control timing of sequential advertising events at determined advertising event time intervals (T_advEvent) from each other using a pseudorandom number generator that implements a pseudorandom number generation algorithm. Broadcast advertising packets are non-connectable. During advertising (or broadcast) state, a link layer of a scanning device scans for and listens for advertising packets on the different advertising channels at sequential listening window times of a scanning sequence that are spaced apart from each other by a determined scan interval, scan_Int that is not synchronized with the advertising events. In some cases, a scanning (or observer) device may continuously listen for advertising packets to ensure timely reception of same. Further information on advertising or broadcasting timing may be found described in U.S. patent application Ser. No. 15/197,166 filed Jun. 29, 2016, and in U.S. patent application Ser. No. 15/650,405, filed Jul. 14, 2017, each of which is incorporated herein by reference in its entirety.

Example types of response packets that may be transmitted by a scanning device in response to received advertising packets of the advertising device include:
SCAN_REQ scan request for further information from advertiser
CONNECT_REQ connect request.

If the advertiser device sends either the ADV_IND or ADV_DIRECT_IND packets, a scanner desiring to exchange data with the advertiser may send a CONNECT_REQ packet. If the advertiser accepts the CONNECT_REQ packet, the devices become connected and the communication may be started. At this point, the advertiser becomes a slave and the scanner becomes a master. After connected, the master device may request bonding with the slave device. This means that the devices exchange long term keys or other encryption info to be stored for future connections. In another case, the connection may be encrypted only for the duration of the connection by pairing, during which short term keys are exchanged between the master device and slave device. Pairing with short term key exchange is normally required to occur before bonding between the devices may occur the first time. Exchange of long term keys or other encryption information for bonding may then occur during the paired connection. Once a master device and slave device have exchanged long term keys or other encryption info, a master device may request bonding directly with the slave device without requiring pairing first.

Instead of the CONNECT_REQ, the scanner device may also respond with SCAN_REQ, which is a request for further information from the advertiser. This may be sent as a response to ADV_IND or ADV_SCAN_IND advertising packets.

When an advertising receives a SCAN_REQ packet from a scanning device, the advertising device may give more information to the scanning device by transmitting a scan response (SCAN_RSP) packet. A SCAN_RSP packet may contain information on the name of the advertising device and on the services the advertising device is able to provide. However, SCAN_RSP packet is not limited to carry only this information but may contain other data as well or instead.

As said, a scanning device wishing to connect with the advertising device may send a CONNECT_REQ packet that contains data on one or more of the following: transmit window size defining timing window for first data packet, transmit window offset that is off when the transmit window starts, connection interval which is the time between connection events, slave latency defines number of times the slave may ignore connection events from the master, connection timeout is maximum time between two correctly received packets in the connection before link is considered to be lost, hop sequence is a random number appointing the starting point for a hop, channel map, CRC (Cyclic Redundancy Check) initialization value. The CONNECT_REQ packet initiates the connection, i.e., creates a point-to-point connection between the devices. After a connection is established between two devices, service and/or service characteristic discovery may occur (with or without pairing or bonding first taking place) during which a first one of the connected devices may send a request to the second connected device asking for a list of services and/or service characteristics that are available from the second device. For example, the second device may respond to this request by providing GATT data to the first device that includes a list of the available BLE services from the second device and/or BLE service characteristics (e.g., configuration data or user data for a service) of the second device. The GATT data may include a list of service universally unique identifiers (UUIDs) and/or service characteristic UUIDs.

Once a connection is established between a pair of wireless devices (e.g., acting as nodes in a mesh network as described herein), the two devices may synchronize timing for non-continuous periodic connection events to follow in order to reduce power consumption. In the BLE specification, the connection interval may be selected to be any value from 7.5 milliseconds to four seconds. This interval may be selected by the master device and transmitted to the slave of the connection. During any given connection event, each wireless device may listen for data packets transmitted in a signal from the other device, and/or transmit data packets to the other device when there is data to send. One or both devices may remain in a sleep or inactive state between the synchronized connection events, during which various device components including radio transmitter, receiver or transceiver components (and possibly one or more wireless device processing devices) are placed in an inactive state to reduce device power consumption. For example, a slave device may ignore any one or more connection events and remain in a sleep state (e.g., with radio not transmitting or listening) during one or more connection events when the slave has no new data to send. In BLE, an integer SLAVE_LATENCY value may be selected to specify the number of consecutive connection events that may be ignored by the slave device before it must wake up and respond to the master to confirm continued existence of the current connection. Because connection events are synchronized during a connection, and because a number of connection events may be ignored, wireless communication in the connected state consumes much less power than in the advertising (or broadcast) state where transmission of advertising packets from the advertising (or broadcasting) device occurs on multiple advertising channels during each advertising event, and where scanning device listening windows are not synchronized with the channel transmissions of the advertising events.

The state for passing advertising packets is called "advertising state" or "broadcast state" as the case may be, and the state for connection is called "connected state". In both states, data transfer occurs. A slave device may be a sensor, actuator or other device, such as a temperature sensor, heart rate sensor, lighting device, proximity sensor, etc. A master device may be any electronic device capable of collecting data, e.g., mobile phone, smart phone, personal digital assistant, personal computer, laptop computer, tablet computer, etc.

Packets sent from a slave device in advertising mode may contain approximately 28 bytes of data and a slave address. Packets from a master device in advertisement channel may contain scanner and advertiser addresses. According to an embodiment, the packets from a master device in advertisement channel contains only a master address. Further information on BLE operations and communications may be found, for example, in United States Patent Application Publication No. 2014/0321321; United States Patent Application Publication No. 2015/0319600; and United States Patent Application Publication No. 2015/0271628, each of which is incorporated herein by reference in its entirety for all purposes.

Embodiments of the disclosed systems and methods may implement BLE wireless communication according to one or more BLE specifications such as Bluetooth 4.x (e.g., Bluetooth 4.0, 4.1, 4.2) core version specifications, Bluetooth 5 core version specification, addendums and supplements thereto, etc. that are available from the Bluetooth Special Interest Group (SIG). However, it will be understood that the above described BLE embodiments are exemplary only, and that the systems and methods described in relation to FIGS. 1-6 may be implemented for non-BLE wireless protocol communication, and/or may be implemented to transmit packets other than BLE packets between two BLE wireless devices.

It will also be understood that one or more of the tasks, functions, or methodologies described herein for a radio module or radio device (e.g., including those described herein for module segment 110 and module segment 120 of FIG. 1 including CPU 150, BLE controller 230 (e.g., baseband 234), etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein. It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

Further, while the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method of operating multiple wireless devices as network nodes in a mesh network, comprising:
   transmitting wireless signals between at least two different pairs of network nodes in the mesh network;
   measuring one or more inter-node signal transmission characteristics of the signals transmitted between the at least two different pairs of network nodes in the mesh network;
   determining mesh communication control information for the mesh network based on the inter-node signal transmission characteristics measured between the different pairs of network nodes of the mesh network, the mesh communication control information specifying one or more connecting network nodes that are a portion of all network nodes to which each network node is to establish a mesh connection; and
   then wirelessly transferring data between the multiple network nodes according to the determined mesh communication control information;
   where the method further comprises determining inter-node broadcast path routing information for the mesh network based on the inter-node signal transmission characteristics measured between the different pairs of network nodes of the mesh network; then broadcasting data from a first network node to all other in-range receiving network nodes; then re-broadcasting the received data from only those receiving network nodes that are designated by the determined mesh communication control information to re-broadcast data from the first node, the designated receiving network nodes being only a portion of the receiving network nodes; where the received data is broadcast only from the designated network nodes without establishing non-broadcast node-to-node connections between the network nodes.

2. The method of claim 1, where a second network node is not within wireless communication range of the first network node; and where the method further comprises relaying transmission of a data packet containing the information of the inter-node signal transmission characteristics measured at the first network node from the first network node to the second network node through an intermediary network node that is within wireless communication range of each of the first and second network nodes; and relaying transmission of the same determined mesh communication control information from the second network node to the first network node through an intermediary network node that is within wireless communication range of each of the first and second network nodes.

3. The method of claim 1, further comprising not re-broadcasting the received data from any receiving network node that is not designated as paired with the first network node by the determined mesh communication control information; and not re-broadcasting the received data from any receiving network node that is only paired with the first network node by the determined mesh communication control information.

4. A method of operating multiple wireless devices as network nodes in a mesh network, comprising:
   transmitting wireless signals between at least two different pairs of network nodes in the mesh network;
   measuring one or more inter-node signal transmission characteristics of the signals transmitted between the at least two different pairs of network nodes in the mesh network;
   determining mesh communication control information for the mesh network based on the inter-node signal transmission characteristics measured between the different pairs of network nodes of the mesh network;
   then wirelessly transferring data between the multiple network nodes according to the determined mesh communication control information; and
   where the method further comprises:
      temporarily positioning a second one of the network nodes within wireless communication range of a first one of the nodes,
      wirelessly communicating the inter-node signal transmission characteristics measured at first network node from the first network node to the second network node while the second network node is positioned within wireless communication range of the first network node,
      using the second network node to determine an inter-node network path routing for the mesh network based at least in part on the wirelessly communicated inter-node signal transmission characteristics received from the first network node and on inter-node signal transmission characteristics measured at a network node different from the first network node,
      wirelessly communicating the mesh communication control information from the second network node to the first network node while the second network node is positioned within wireless communication range of the first network node, and
      then positioning the second one of the network nodes outside of wireless communication range of the first network node, and implementing the determined inter-node network path routing in the wireless network while the second network node is not in wireless communication range of the first network node.

5. The method of claim 4,
   the mesh communication control information specifying one or more connecting network nodes that are a portion of all network nodes to which each network node is to establish a mesh connection to create a node-to-node data communication path through all nodes of the at least two different pairs of network nodes; and the method further comprising:
   wirelessly communicating the same determined mesh communication control information from at least one node to all other nodes of the at least two different pairs of network nodes;
   storing the same communicated determined mesh communication control information in memory of all nodes of the at least two different pairs of network nodes; and
   then wirelessly transferring data through the node-to-node data communication path sequentially through all nodes of the at least two different pairs of network nodes according to the same determined mesh communication control information.

6. The method of claim 1, comprising determining non-broadcast inter-node connection path routing information for the mesh network based on the inter-node signal transmission characteristics measured between the different pairs of network nodes of the mesh network to create the node-to-node data communication path through all nodes of the at least two different pairs of network nodes; then opening and establishing non-broadcast node-to-node connections between only those pairs of the network nodes designated by the same determined mesh communication control information; and then transferring the data between only those designated pairs of the multiple network nodes to sequentially transfer the data through all nodes of the at least two different pairs of network nodes using the established non-broadcast connections.

7. The method of claim 1, further comprising:
wirelessly communicating the inter-node signal transmission characteristics measured at the first one of the network nodes as information contained within a data packet transmitted from the first network node to the second one of the network nodes, the inter-node signal transmission characteristics comprising at least one of inter-node distance-indicative measurement, Angle of Arrival (AoA) and Angle of Departure (AoD);
then using the second network node to determine the inter-node network path routing for the mesh network based at least in part on the wirelessly communicated inter-node signal transmission characteristics received as the information contained within the data packet from the first network node and on the inter-node signal transmission characteristics measured at a network node different from the first network node; and
then wirelessly communicating the same determined mesh communication control information from the second network node to all other network nodes of the at least two different pairs of network nodes and storing the same determined mesh communication control information in the memory of all the other nodes of the at least two different pairs of network nodes to implement the determined inter-node network path routing in the wireless network.

8. The method of claim 5, where the step of determining mesh communication control information comprises:
determining position of each of the different network nodes and distance between each pair of different network nodes in the mesh network; and
designating mesh communication inter-node pairs that connect all of the network nodes together with a minimum total connection path length between the multiple network nodes.

9. The method of claim 5, where the step of determining mesh communication control information comprises:
measuring received signal strength between each pair of the different network nodes in the network; and
designating a minimum number of mesh communication inter-node pairs having the highest inter-node signal strength that connect all of the network nodes together.

10. The method of claim 1, where one or more inter-node signal transmission characteristics of the signals transmitted between the at least two different pairs of network nodes in the mesh network comprise at least one of a measured characteristic of a transmitted wireless signal that is indicative of a direction from which the signal is received, a measured characteristic of a transmitted wireless signal that is indicative of a spatial location of a device that transmitted the signal, or a measured characteristic of a transmitted wireless signal that is indicative of a strength of the signal as it is received.

11. The method of claim 1, where one or more inter-node signal transmission characteristics of the signals transmitted between the at least two different pairs of network nodes in the mesh network comprise at least one of inter-node distance-indicative measurement, Angle of Arrival (AoA) and Angle of Departure (AoD).

12. The method of claim 1, where each of the wireless devices is a Bluetooth Low Energy (BLE) enabled device; and where the wireless signals transmitted between the at least two different pairs of network nodes in the mesh network are BLE wireless signals; and where the method further comprises wirelessly transferring data in BLE wireless signals through the node-to-node data communication path sequentially through all nodes of the at least two different pairs of network nodes according to the same determined mesh communication control information.

13. The method of claim 1, where the same determined mesh communication control information further comprises pre-connection role (scanner or advertiser) and connection role (master or slave) that each network node is to play relative to each identified connecting node to establish a connection.

14. The method of claim 1, where the same determined mesh communication control information identifies specific inter-node pairs designated for transferring data through the node-to-node data communication path sequentially through all nodes of the at least two different pairs of network nodes.

15. The method of claim 1, where the same determined mesh communication control information is a routing table that identifies specific inter-node pairs designated for transferring data through the node-to-node data communication path sequentially through all nodes of the at least two different pairs of network nodes.

16. The method of claim 1, where the same determined mesh communication control information identifies a first set of specific inter-node pairs designated for transferring data sequentially through a first node-to-node data communication path according to a given wireless communication protocol for a first application when it is executed by one or more of the network nodes; and a second and different set of specific inter-node pairs designated for transferring data sequentially through a second and different node-to-node data communication path according to the same given wireless communication protocol for a second application when it is executed by one or more of the network nodes; and where the method further comprises determining and establishing inter-node connections between the multiple network nodes according to the first set of specific inter-node pairs for the given wireless communication protocol when the first application is currently executing, and then re-determining and establishing inter-node connections between the multiple network nodes according to the different and second set of specific inter-node pairs for the same given wireless communication protocol when the second application is currently executing.

17. The method of claim 1, where measuring one or more inter-node signal transmission characteristics of the signals transmitted between the at least two different pairs of network nodes in the mesh network comprises measuring the inter-node signal transmission characteristics in both directions by measuring the inter-node signal transmission characteristic between each given pair of network nodes at both of the network nodes of the given pair of network nodes.

18. The method of claim 1, further comprising broadcasting the same determined mesh communication control information to all receiving network nodes; then responding to the received same determined mesh communication control information by opening a non-broadcast wireless connection path from each given receiving network node to only those other network nodes that are specified as being paired to the given receiving network node by the same determined mesh communication control information; and then wirelessly transferring mesh data only across the opened non-broadcast wireless connection paths.

19. The method of claim 1, where one or more inter-node signal transmission characteristics of the signals transmitted between the at least two different pairs of network nodes in the mesh network comprise at least one of Angle of Arrival (AoA) or Angle of Departure (AoD).

20. A system, comprising:
a first apparatus comprising at least one processing device coupled to radio circuitry and configured to be coupled to an antenna as a first wireless network node in a wireless mesh network that includes multiple other network nodes;
a second apparatus comprising at least one processing device coupled to radio circuitry and configured to be coupled to an antenna as a second wireless network node in the wireless mesh network, the at least one processing device of the second apparatus being programmed to operate the second wireless network node to:
at least one of receive inter-node signal transmission characteristics measured between at least two different pairs of network nodes of the mesh network, measure inter-node signal transmission characteristics measured between at least two different pairs of network nodes of the mesh network, or a combination thereof,
determine mesh communication control information for the mesh network based on the inter-node signal transmission characteristics measured between the different pairs of network nodes of the mesh network, the mesh communication control information specifying one or more connecting network nodes that are a portion of all network nodes to which each network node is to establish a mesh connection, and
then wirelessly communicate the determined mesh communication control information to other nodes of the wireless mesh network, the other nodes including the first network node; and
where the processing device of the first network node is further programmed to receive the determined mesh communication control information and wirelessly transfer data to one or more other network nodes according to the determined mesh communication control information; and
where the processing device of the second network node is programmed to determine inter-node broadcast path routing information for the mesh network based on the inter-node signal transmission characteristics measured between the different pairs of network nodes of the mesh network; and where the processing device of the first network node is programmed to then receive data broadcast from another network node to all other in-range receiving network nodes, then re-broadcast the received data from the first node without establishing a non-broadcast node-to-node connection with other network nodes only if the first node is designated by the determined mesh communication control information to re-broadcast data from the another node.

21. The system of claim 20,
the mesh communication control information specifying one or more connecting network nodes that are a portion of all network nodes to which each network node is to establish a mesh connection to create a node-to-node data communication path through all nodes of the at least two different pairs of network nodes, and
the at least one processing device of the second apparatus being programmed to operate the second wireless network node to then wirelessly communicate the same determined mesh communication control information to all other nodes of the at least two different pairs of network nodes of the wireless mesh network, the other nodes including the first network node; and
where the processing device of the first network node is further programmed to receive and store in memory the same determined mesh communication control information, and wirelessly transfer data to one or more other network nodes according to the same determined mesh communication control information.

22. The system of claim 21, where the processing device of the first network node is further programmed to:
receive a wireless signal from at least one other network node and measure one or more inter-node signal transmission characteristics of the received wired signal; and
wirelessly communicate the measured inter-node signal transmission characteristics measured at the first network node as information contained within a data packet transmitted from the first network node to the second network node, the inter-node signal transmission characteristics comprising at least one of inter-node distance-indicative measurement, Angle of Arrival (AoA) and Angle of Departure (AoD);
where the processing device of the second network node is further programmed to:
determine an inter-node network path routing for the mesh network based at least in part on the wirelessly communicated inter-node signal transmission characteristics read from the data packet received from the first network node and on inter-node signal transmission characteristics measured at a network node different from the first network node, and
then wirelessly communicate the same determined mesh communication control information from the second network node to all other network nodes at least two different pairs of network nodes including the first network node; and
where the processing device of the first network node is further programmed to implement the determined inter-node network path routing in the wireless network based on the same determined mesh communication control information received from the second network node.

23. The system of claim 21, where the processing device of the first network node is further programmed to:
relay received inter-node signal transmission characteristics measured at a third network node as information contained within a data packet to the second network node when the second network node is not in wireless communication range with the third network node, the inter-node signal transmission characteristics comprising at least one of inter-node distance-indicative measurement, Angle of Arrival (AoA) and Angle of Departure (AoD); and
relay the same determined mesh communication control information received from the second network node to the third network node when the second network node is not in wireless communication range with the third network node.

24. The system of claim 21, where the at least one processing device of the second network node is programmed to determine the same determined mesh communication control information for the mesh network by:
  determining a position of each of the network nodes and distance between each pair of network nodes in the wireless mesh network from at least one of received inter-node signal transmission characteristics measured between different pairs of network nodes of the mesh network, measured inter-node signal transmission characteristics measured between different pairs of network nodes of the mesh network, or combination thereof; and
  designating mesh communication inter-node pairs that connect all of the network nodes together with a minimum total connection path length between the multiple network nodes.

25. The system of claim 21, where the at least one processing device of the second network node is programmed to determine the same determined mesh communication control information for the mesh network by:
  determining received signal strength between each pair of the network nodes in the wireless mesh network from at least one of received inter-node signal transmission characteristics measured between different pairs of network nodes of the mesh network, measured inter-node signal transmission characteristics measured between different pairs of network nodes of the mesh network, or a combination thereof; and
  designating a minimum number of mesh communication inter-node pairs having the highest inter-node signal strength that connect all of the network nodes together.

26. The system of claim 21, where one or more inter-node signal transmission characteristics of the signals transmitted between the at least two different pairs of network nodes in the mesh network comprise at least one of a measured characteristic of a transmitted wireless signal that is indicative of a direction from which the signal is received, a measured characteristic of a transmitted wireless signal that is indicative of a spatial location of a device that transmitted the signal, or a measured characteristic of a transmitted wireless signal that is indicative of a strength of the signal as it is received.

27. The system of claim 21, where one or more inter-node signal transmission characteristics of the signals transmitted between the at least two different pairs of network nodes in the mesh network comprise at least one of inter-node distance-indicative measurement, Angle of Arrival (AoA) and Angle of Departure (AoD).

28. The system of claim 21, where each of the first apparatus and second apparatus is a Bluetooth Low Energy (BLE) enabled wireless device that is configured to receive and transmit BLE wireless signals to other BLE wireless network nodes in the mesh network.

* * * * *